US008688496B1

(12) United States Patent
Tansupaswatdikul et al.

(10) Patent No.: US 8,688,496 B1
(45) Date of Patent: Apr. 1, 2014

(54) SYSTEM AND METHOD FOR TRANSFERRING ARTICLES SUCH AS AIRLINE TRANSFER BAGS

(75) Inventors: Pongsakon Tansupaswatdikul, Irving, TX (US); Alejandro Scalise, Bedford, TX (US); Tuell C. Green, Euless, TX (US); James T. Diamond, Grapevine, TX (US); Murali Ande, Flower Mound, TX (US); Jeff C. Johnson, Roanoke, TX (US)

(73) Assignee: American Airlines, Inc., Fort Worth, TX (US)

( * ) Notice: Subject to any disclaimer, the term of this patent is extended or adjusted under 35 U.S.C. 154(b) by 1052 days.

(21) Appl. No.: 12/349,926

(22) Filed: Jan. 7, 2009

Related U.S. Application Data

(63) Continuation-in-part of application No. 12/183,645, filed on Jul. 31, 2008.

(51) Int. Cl.
G06Q 10/00 (2012.01)
G06Q 50/00 (2012.01)

(52) U.S. Cl.
USPC .............................. 705/7.13; 705/5; 705/338

(58) Field of Classification Search
USPC ......... 705/5–6, 7.11–7.13, 338; 701/200–203
See application file for complete search history.

(56) References Cited

U.S. PATENT DOCUMENTS

| 5,793,639 | A | * | 8/1998 | Yamazaki | 705/5 |
| 6,003,009 | A | * | 12/1999 | Nishimura | 705/5 |
| 6,044,353 | A | * | 3/2000 | Pugliese, III | 705/5 |
| 6,108,636 | A | * | 8/2000 | Yap et al. | 705/5 |
| 6,580,046 | B1 | * | 6/2003 | Koini et al. | 700/226 |
| 6,721,714 | B1 | * | 4/2004 | Baiada et al. | 705/7.13 |
| 2002/0107714 | A1 | * | 8/2002 | Whitlock et al. | 705/8 |
| 2005/0192701 | A1 | * | 9/2005 | Ben-Ezra | 700/213 |
| 2005/0246224 | A1 | | 11/2005 | McKanna et al. | |

OTHER PUBLICATIONS

Haghani, et al., Optimizing Gate Assignments at Airport Terminals, Transp. Res., vol. 32, No. 6, 1998, pp. 437-454.*
Lim, et al., Airport Gate Scheduling with Time Windows, Artificial Intelligence Rev., vol. 24, 2005, pp. 5-31.*
Abdelghany, et al., Scheduling Baggage-Handling Facilities in Congested Airports, J. of Air Transp. Mgmt., vol. 12, 2006, pp. 76-81.*
Jeff Bailey, "Airlines Work on Systems to Reduce Delays" The New York Times, Nov. 15, 2007, 4 pages, nytimes.com, N.Y., USA.
U.S. Appl. No. 12/183,645, filed Jul. 31, 2008, Niznik et al.
U.S. Appl. No. 12/350,160, filed Jan. 7, 2009, Ande et al.
U.S. Appl. No. 12/350,178, filed Jan. 7, 2009, Osborne et al.
U.S. Appl. No. 61/143,075, filed Jan. 7, 2009, Green et al.

* cited by examiner

*Primary Examiner* — Daniel Vetter
(74) *Attorney, Agent, or Firm* — Haynes and Boone, LLP

(57) ABSTRACT

A system and method for transferring articles such as, for example, airline transfer bags, according to which, in several exemplary embodiments, the articles are transferred from an arrival gate of an inbound flight to one or more departure gates of connecting flights.

25 Claims, 25 Drawing Sheets

Inbound Flights for DFW C19  
1802|SAN|14:48|C19|SP80|120 ▶ DRH  
Roll Time 15:09  Drivers 3

Driver Assignments | Reshow Connects

Manual Solution — In edit mode — 84

Driver 1 — 82a / 84a

| Flight | Gate | Bags | Conn | Dest | BagRc |
|---|---|---|---|---|---|
| 1259 | A37 | 4 | 65 | XNA | |
| 1848 | A39 | 3 | 55 | BNA | |
| 1489 | A34 | 5 | 55 | MSY | |
| 0422 | A29 | 5 | 50 | RDU | |
| 1380 | A24 | 4 | 35 | IND | |
| 1408 | A15 | 9 | 65 | OKC | |
| 2034 | A15 | 4 | 100 | FLL | ✓ |
| 1298 | A10 | 1 | 120 | BWI | ✓ |

Driver 2 — 84b

| Flight | Gate | Bags | Conn | Dest | BagRc |
|---|---|---|---|---|---|
| 0484 | D29 | 13 | 55 | MIA | |
| 2238 | D34 | 1 | 110 | CLT | ✓ |
| 1366 | D40 | 5 | 120 | MEM | ✓ |
| 0048 | D22 | 4 | 120 | CDG | ✓ |
| 2312 | D27 | 1 | 145 | DTW | ✓ |
| 2195 | D29 | 2 | 160 | GUA | ✓ |

Driver 3 — 84c

| Flight | Gate | Bags | Conn | Dest | BagRc |
|---|---|---|---|---|---|
| 1316 | C31 | 2 | 80 | TPA | |
| 1074 | C26 | 2 | 65 | ATL | |
| 2036 | C4 | 3 | 60 | MCI | |
| 1476 | C8 | 9 | 90 | DCA | ✓ |
| 1046 | C2 | 1 | 105 | MIA | ✓ |
| 1188 | C31 | 1 | 140 | DCA | ✓ |
| 2274 | C30 | 2 | 155 | TUL | ✓ |
| 1808 | C36 | 1 | 180 | PBI | ✓ |

Optimal Solution — 82

Driver 1

| Flight | Gate | Bags | Conn | Dest | BagRc |
|---|---|---|---|---|---|
| 1259 | A37 | 4 | 65 | XNA | |
| 1848 | A39 | 3 | 55 | BNA | |
| 1489 | A34 | 5 | 55 | MSY | |
| 0422 | A29 | 5 | 50 | RDU | |
| 1380 | A24 | 4 | 35 | IND | |
| 1408 | A15 | 9 | 65 | OKC | |
| 2034 | A15 | 4 | 100 | FLL | ✓ |
| 1298 | A10 | 1 | 120 | BWI | ✓ |

Driver 2 — 82ba ... 82bf

| Flight | Gate | Bags | Conn | Dest | BagRc |
|---|---|---|---|---|---|
| 2036 | C4 | 3 | 60 | MCI | |
| 2238 | D34 | 1 | 110 | CLT | ✓ |
| 1366 | D40 | 5 | 120 | MEM | ✓ |
| 0048 | D22 | 4 | 120 | CDG | ✓ |
| 2312 | D27 | 1 | 145 | DTW | ✓ |
| 2195 | D29 | 2 | 160 | GUA | ✓ |
| 0484 | D29 | 13 | 55 | MIA | |
| 1316 | C31 | 2 | 80 | TPA | |

Driver 3

| Flight | Gate | Bags | Conn | Dest | BagRc |
|---|---|---|---|---|---|
| 1476 | C8 | 9 | 90 | DCA | ✓ |
| 1046 | C2 | 1 | 105 | MIA | ✓ |
| 1188 | C31 | 1 | 140 | DCA | ✓ |
| 2274 | C30 | 2 | 155 | TUL | ✓ |
| 1808 | C36 | 1 | 180 | PBI | ✓ |
| 0436 | C4 | 2 | 220 | FLL | ✓ |

SYSTEM AND METHOD FOR TRANSFERRING ARTICLES SUCH AS AIRLINE TRANSFER BAGS

CROSS REFERENCE TO RELATED APPLICATIONS

This application is a continuation-in-part of U.S. patent application Ser. No. 12/183,645, filed on Jul. 31, 2008, the disclosure of which is incorporated herein by reference.

This application is related to (1) U.S. patent application Ser. No. 12/183,645, filed on Jul. 31, 2008; (2) U.S. patent application Ser. No. 61/143,075, filed on Jan. 7, 2009; (3) U.S. patent application Ser. No. 12/350,178, filed on Jan. 7, 2009; and (4) U.S. patent application Ser. No. 12/350,160, filed on Jan. 7, 2009, the disclosures of which are incorporated herein by reference.

BACKGROUND

The present disclosure relates in general to a system and method for transferring articles such as, for example, airline transfer bags, and in particular to a system and method for transferring airline transfer bags from an arrival gate of an inbound flight to one or more departure gates of connecting flights.

BRIEF DESCRIPTION OF THE DRAWINGS

FIGS. 7 and 8 are diagrammatic illustrations of portions of output generated during the step of FIG. 6, according to respective exemplary embodiments.

Figure 12:
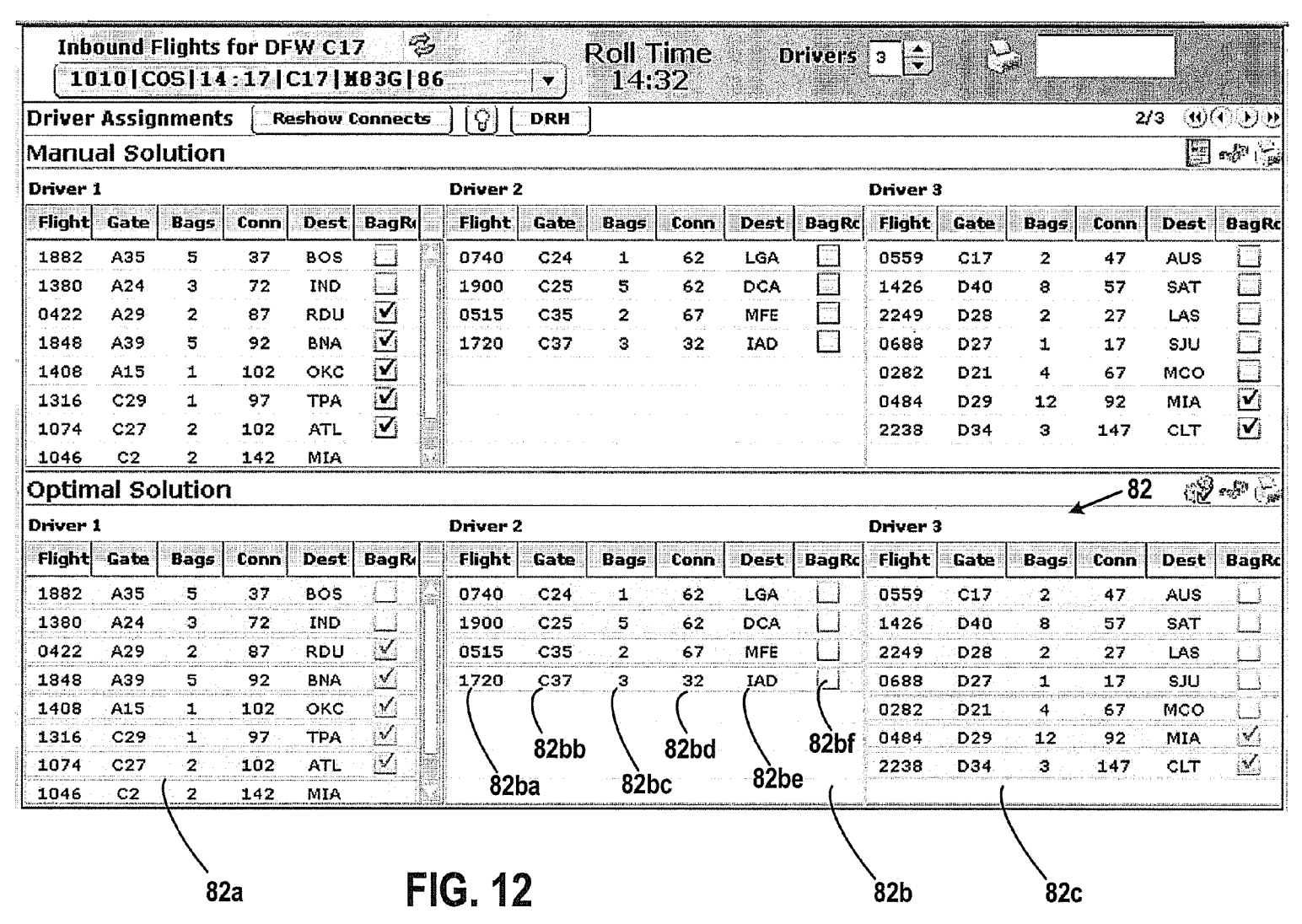
Figure 14:
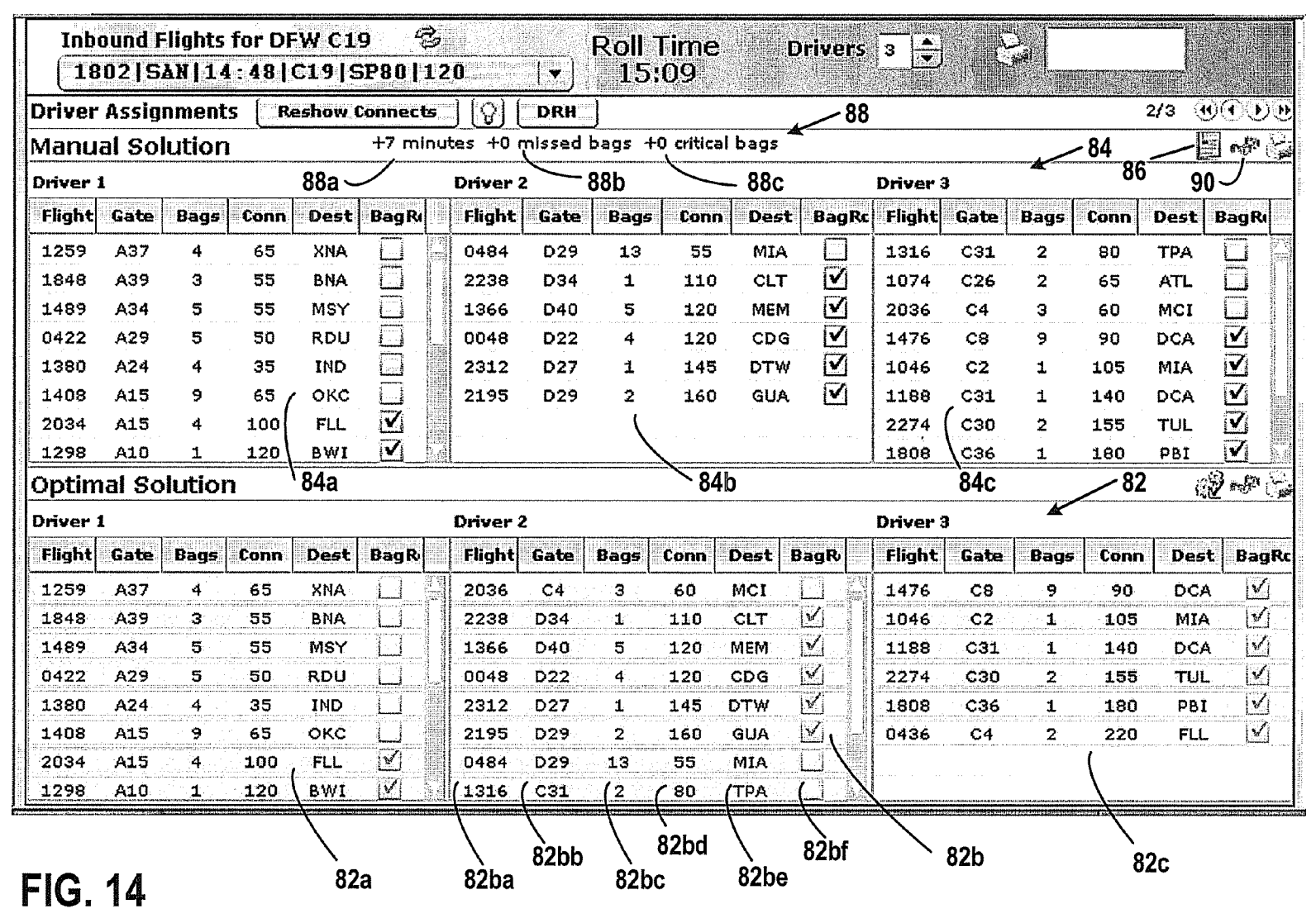

FIGS. 12, 13, 14 and 15 are diagrammatic illustrations of other portions of the output generated during the step of FIG. 6, according to respective exemplary embodiments.

DETAILED DESCRIPTION

Figure 1A:
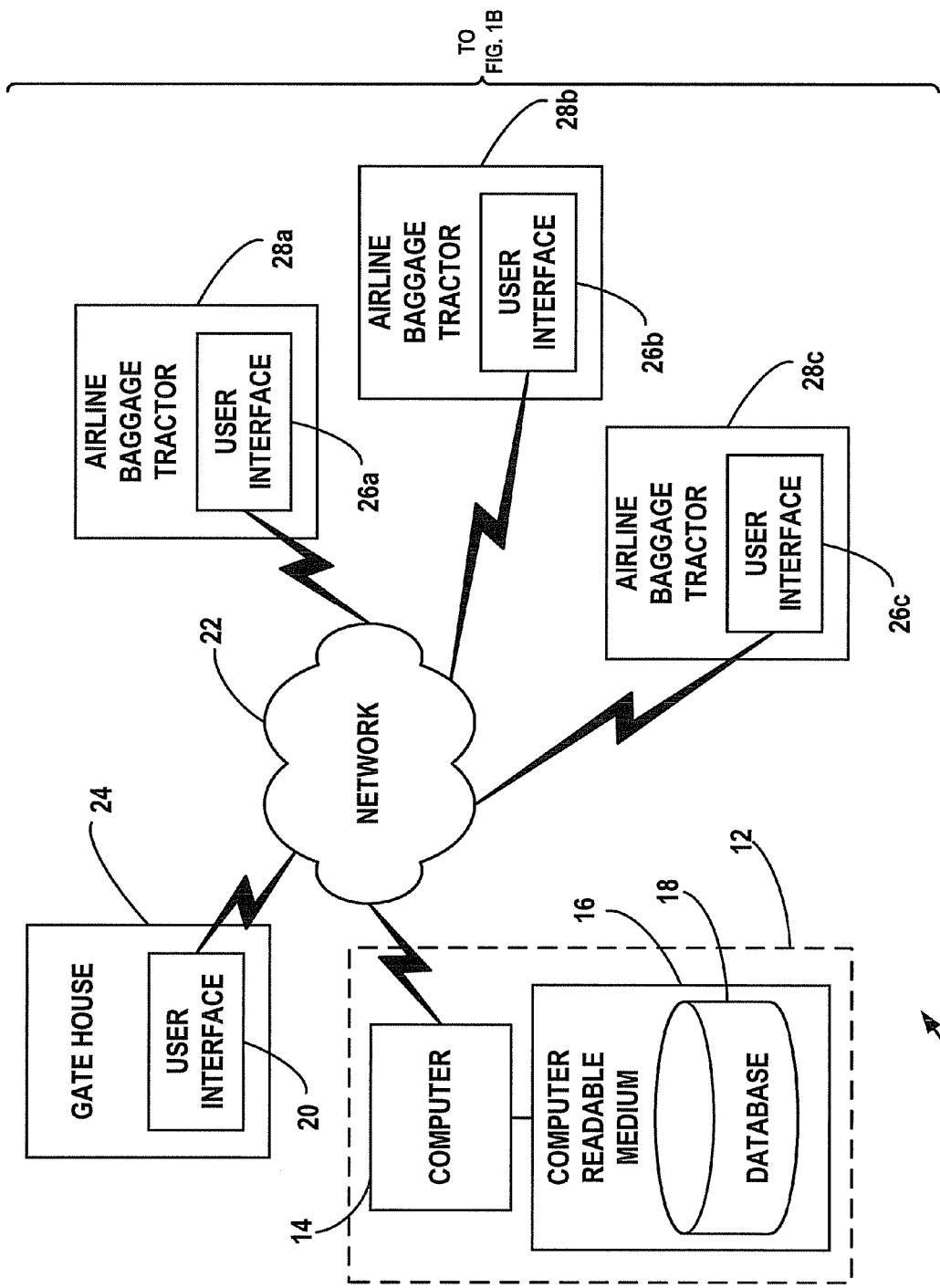
FIGS. 1A and 1B are diagrammatic illustrations of a system according to an exemplary embodiment, the system including a functional module, a plurality of user interfaces, a plurality of airline baggage tractors, an arrival gate, transfer bags, and a plurality of departure gates, according to respective exemplary embodiments.
Figure 1B:
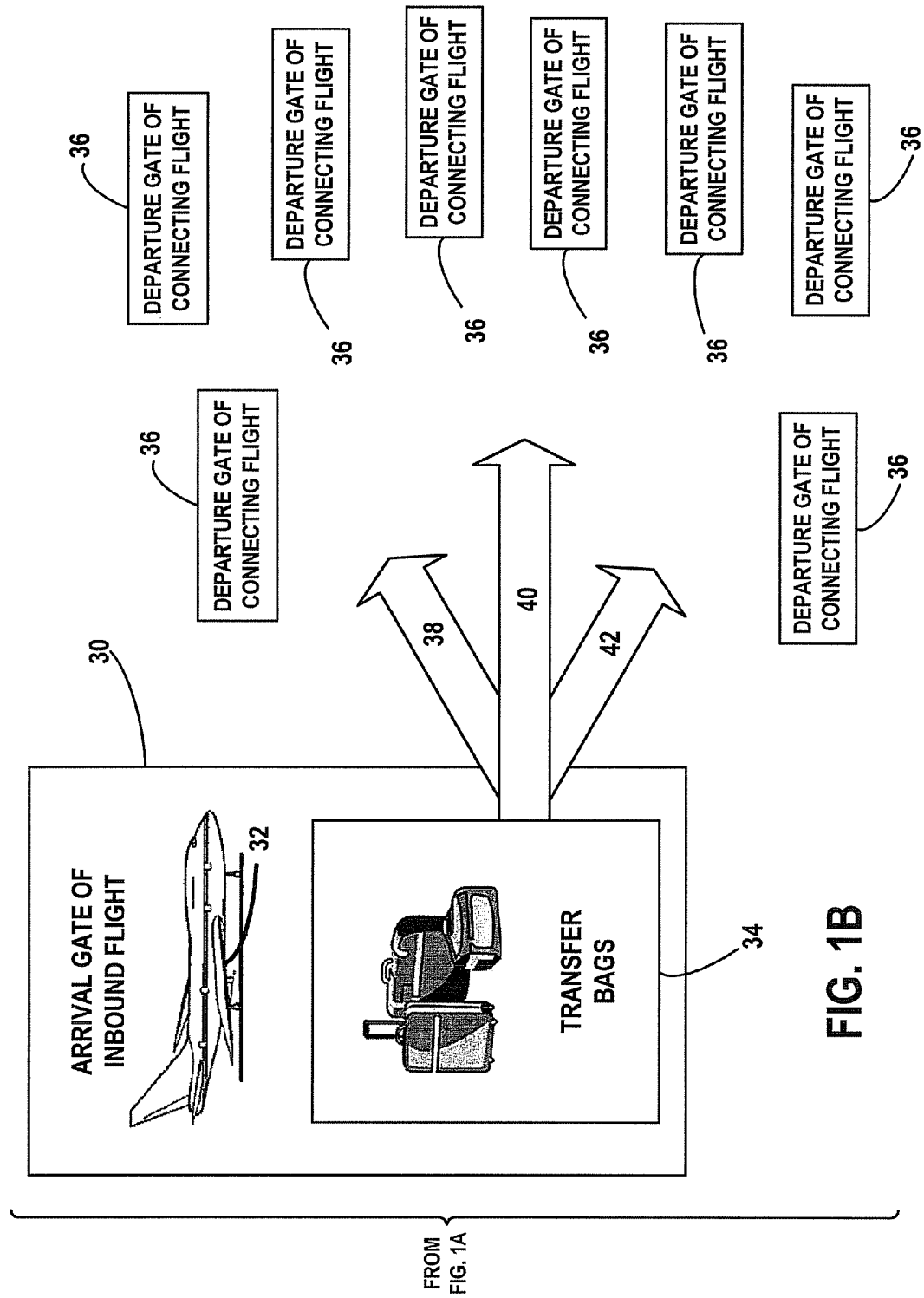

In an exemplary embodiment, as illustrated in FIGS. 1A and 1B, a system is generally referred to by the reference numeral 10, and includes a functional module 12 including a computer 14 and a computer readable medium 16 operably coupled thereto. Instructions accessible to, and executable by, the computer 14 are stored in the computer readable medium 16. A database 18 is also stored in the computer readable medium 16. A user interface 20 is operably coupled to, and in two-way communication with, the computer 14 of the module 12 via a network 22. The user interface 20 is positioned in, or proximate, a gate house 24, which, in several exemplary embodiments, houses equipment and/or vehicles used in connection with services related to airplanes, such as, for example, airline baggage tractors for loading bags on, and unloading bags off, commercial airplanes, and transporting bags between airplanes and airport terminals. User interfaces 26a, 26b and 26c are operably coupled to, and in two-way communication with, the computer 14 of the module 12 via the network 22. The user interfaces 26a, 26b and 26c are associated with airline baggage tractors (or tugs) 28a, 28b and 28c, respectively, each of which includes one or more carts for transporting bags, under conditions to be described below.

As shown in FIG. 1B, the system 10 further includes an arrival gate 30 of an inbound flight of an airplane 32, which includes a plurality of transfer bags 34. Each of the transfer bags 34 is adapted to be transferred from the arrival gate 30 to one of a plurality of departure gates 36 from which a connecting flight is to depart, under conditions to be described below. The transfer bags 34 include, for example, luggage, freight, cargo, mail, and/or any combination thereof, and are adapted to be transferred to the respective gates 36 via transfer routes 38, 40 and 42, under conditions to be described below.

In an exemplary embodiment, the module 12 and/or one or more components thereof are part of, and/or are distributed throughout, the system 10 and/or one or more of the components thereof, including one or more of the user interfaces 20, 26a, 26b and 26c. In an exemplary embodiment, the computer readable medium 16 and/or content stored therein are part of, and/or are distributed throughout, the system 10 and/or one or more of the components thereof, including one or more of the user interfaces 20, 26a, 26b and 26c. In an exemplary embodiment, the database 18 and/or content stored therein are part of, and/or are distributed throughout, the system 10 and/or one or more of the components thereof, including one or more of the user interfaces 20, 26a, 26b and 26c. In an exemplary embodiment, the network 22 includes the Internet, one or more local area networks, one or more wide area networks, one or more wireless networks, one or more voice networks, one or more data networks, and/or any combination thereof.

In several exemplary embodiments, the respective quantities of one or more of the components and/or parts of the system 10, such as, for example, the respective quantities of the module 12, the computer 14, the computer readable medium 16, the database 18, the user interface 20, the network 22, the gate house 24, the user interfaces 26, the tractors 28, the arrival gate 30, the airplane 32, the transfer bags 34, the departure gates 36, the route 38, the route 40, and the route 42, are increased, decreased or otherwise varied.

Figure 2:
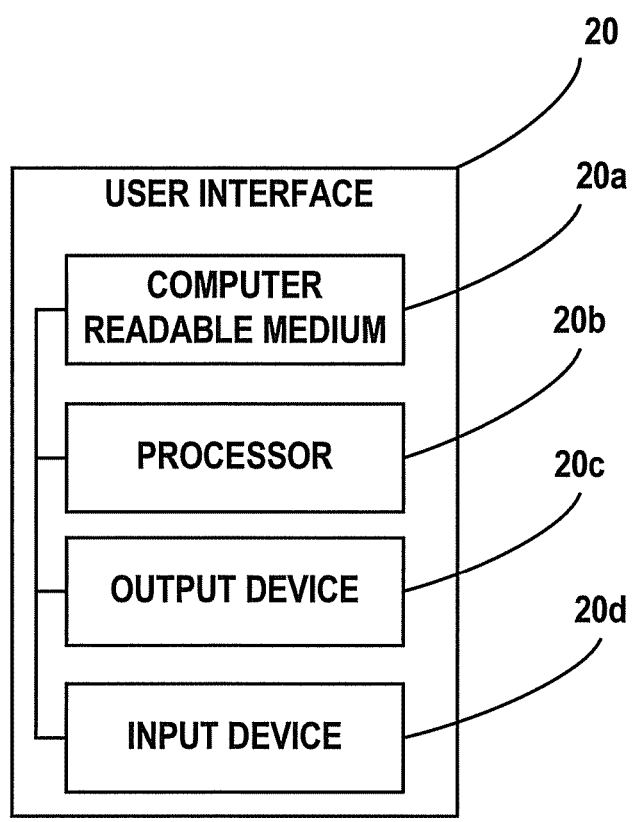
FIG. 2 is a diagrammatic illustration of one of the user interfaces of FIGS. 1A and 1B, according to an exemplary embodiment.

In an exemplary embodiment, as illustrated in FIG. 2 with continuing reference to FIGS. 1A and 1B, the user interface 20 includes a computer readable medium 20a, a processor 20b, an output device 20c, and an input device 20d. In an exemplary embodiment, instructions accessible to, and executable by, the processor 20b are stored in the computer readable medium 20a. In an exemplary embodiment, web browser software is stored in the computer readable medium 20a. In an exemplary embodiment, the output device 20c includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 20c includes a graphical display, a printer, a plotter, and/or any combination thereof. In an exemplary embodiment, the input device 20d includes a touch screen, which, in several exemplary embodiments, is, includes, or is at least a part of, the output device 20c. In an exemplary embodiment, instead of, or in addition to a touch screen, the input device 20d includes one or more keyboards, one or more pin pads, one or more scanners, one or more card readers, and/or any combination thereof.

In several exemplary embodiments, the user interface 20 is located at the same location as one or more of the module 12, the computer 14 of the module 12, the gate house 24, one or more of the baggage tractors 28a, 28b and 28c, one or more of the user interfaces 26a, 26b and 26c, the arrival gate 30, the airplane 32, one or more of the departure gates 36, and/or any combination thereof. In several exemplary embodiments, the user interface 20 is located remotely from one or more of the module 12, the computer 14 of the module 12, the gate house 24, one or more of the baggage tractors 28a, 28b and 28c, one or more of the user interfaces 26a, 26b and 26c, the arrival gate 30, the airplane 32, one or more of the departure gates 36, and/or any combination thereof. In several exemplary embodiments, the user interface 20 is a thin client and the computer 14 controls at least a portion of the operation of the user interface 20. In several exemplary embodiments, the user interface 20 is a thick client. In several exemplary embodiments, the user interface 20 functions as both a thin client and a thick client. In several exemplary embodiments, the user interface 20 is, or includes, a telephone, a personal computer, a personal digital assistant, a cellular telephone, other types of telecommunications devices, other types of computing devices, and/or any combination thereof. In several exemplary embodiments, the user interface 20 includes a plurality of user interfaces. In several exemplary embodiments, the user interface 20 is, or at least includes, the module 12. In several exemplary embodiments, the user interface 20 is, or at least includes, one or more of the computer 14, the computer readable medium 16, the database 18, one or more of the user interfaces 28a, 28b and 28c, and/or any combination thereof.

Figure 3:
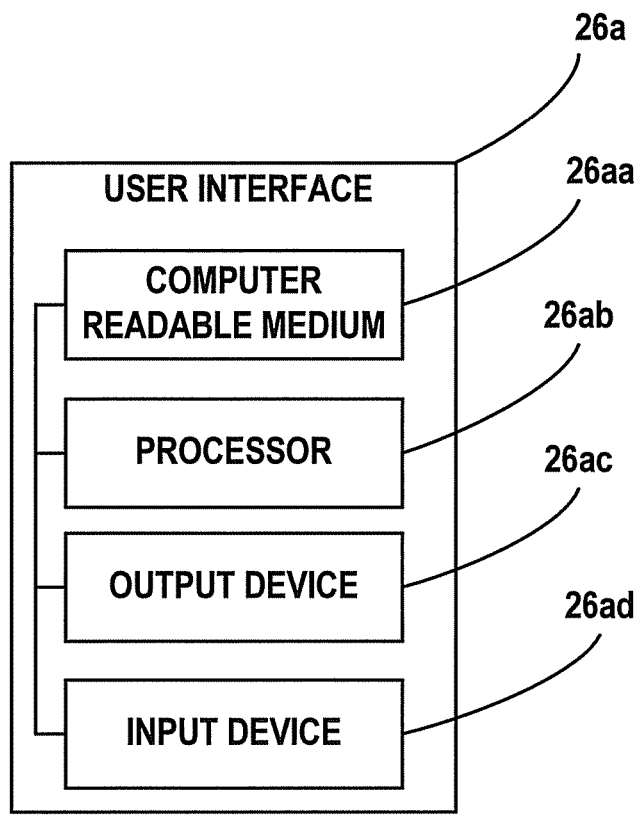
FIG. 3 is a diagrammatic illustration of another of the user interfaces of FIGS. 1A and 1B, according to an exemplary embodiment.

In an exemplary embodiment, as illustrated in FIG. 3 with continuing reference to FIGS. 1A-2, the user interface 26a includes a computer readable medium 26aa, a processor 26ab, an output device 26ac, and an input device 26ad. In an exemplary embodiment, instructions accessible to, and executable by, the processor 26ab are stored in the computer readable medium 26aa. In an exemplary embodiment, web browser software is stored in the computer readable medium 26aa. In an exemplary embodiment, the output device 26ac includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 26ac includes a graphical display, a printer, a plotter, and/or any combination thereof. In an exemplary embodiment, the input device 26ad includes a touch screen, which, in several exemplary embodiments, is, includes, or is at least a part of, the output device 26ac. In an exemplary embodiment, instead of, or in addition to a touch screen, the input device 26ad includes one or more keyboards, one or more pin pads, one or more scanners, one or more card readers, and/or any combination thereof. In an exemplary embodiment, the user interface 26a is substantially identical to the user interface 20.

Figure 4:
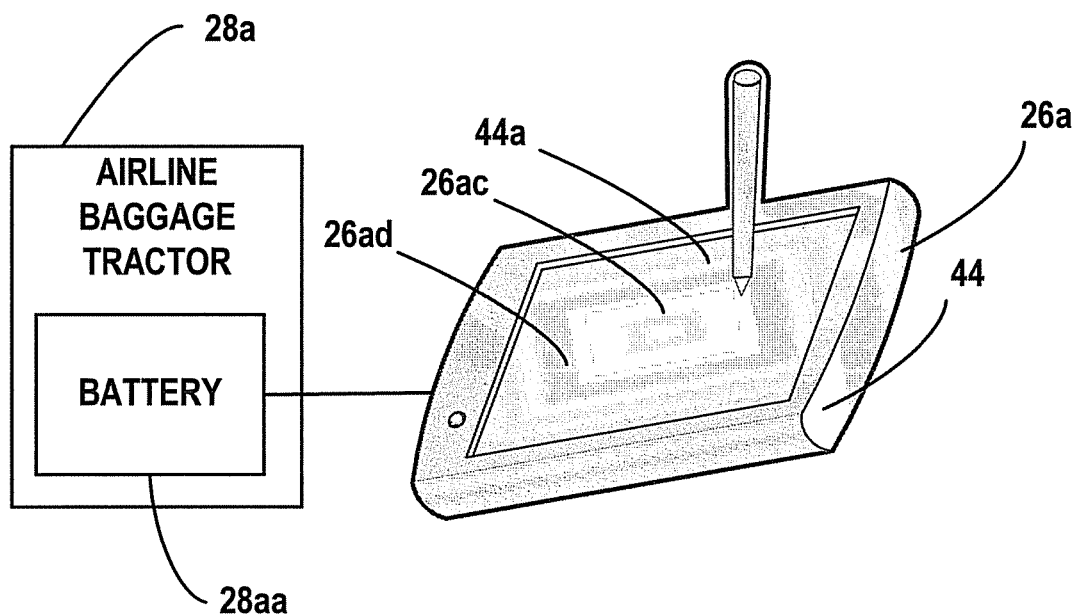
FIG. 4 is a diagrammatic illustration of the user interface of FIG. 3 electrically coupled to a battery of an airline baggage tractor of FIG. 1A.

In an exemplary embodiment, as illustrated in FIG. 4 with continuing reference to FIGS. 1A-3, the user interface 26a includes a ruggedized tablet personal computer 44 having a relatively large operating temperature range and being configured for use in outdoor applications on moving vehicles. The output device 26ac and the input device 26ad are combined and include a 12-inch reflective screen 44a with touch screen functionality and brightness dial. The tablet personal computer 44 is substantially dust-proof, substantially weather-proof, substantially able to withstand a power wash, substantially vibration-proof, and/or any combination thereof. The tablet personal computer 44 is electrically coupled to, and thus is powered by, a battery 28aa of the airline baggage tractor 28a.

In several exemplary embodiments, the user interface 26a is located at the same location as one or more of the module 12, the computer 14 of the module 12, the gate house 24, one or more of the baggage tractors 28a, 28b and 28c, the user interface 20, one or more of the user interfaces 26b and 26c, the arrival gate 30, the airplane 32, one or more of the departure gates 36, and/or any combination thereof. In several exemplary embodiments, the user interface 26a is located remotely from one or more of the module 12, the computer 14 of the module 12, the gate house 24, one or more of the baggage tractors 28a, 28b and 28c, the user interface 20, one or more of the user interfaces 26b and 26c, the arrival gate 30, the airplane 32, one or more of the departure gates 36, and/or any combination thereof. In several exemplary embodiments, the user interface 26a is a thin client and the computer 14 controls at least a portion of the operation of the user interface 26a. In several exemplary embodiments, the user interface 26a is a thick client. In several exemplary embodiments, the user interface 26a functions as both a thin client and a thick client. In several exemplary embodiments, the user interface 26a is, or includes, a telephone, a personal computer, a personal digital assistant, a cellular telephone, other types of telecommunications devices, other types of computing devices, and/or any combination thereof. In several exemplary embodiments, the user interface 26a includes a plurality of user interfaces. In several exemplary embodiments, the user interface 26a is, or at least includes, the module 12. In several exemplary embodiments, the user interface 26a is, or at least includes, one or more of the computer 14, the computer readable medium 16, the database 18, the user interface 20, one or more of the user interfaces 28b and 28c, and/or any combination thereof.

In an exemplary embodiment, each of the user interfaces 26b and 26c is substantially identical to the user interface 26a and therefore will not be described in detail. In several exemplary embodiments, the platforms of the user interfaces 20, 26a, 26b and 26c are identical. In several exemplary embodiments, the platforms of the user interfaces 20, 26a, 26b and 26c are different. In several exemplary embodiments, the platforms of the user interfaces 20, 26a, 26b and 26c vary with respect to equipment, peripherals, hardware architecture and/ or specifications, software architecture and/or specifications, and/or any combination thereof.

Figure 5:
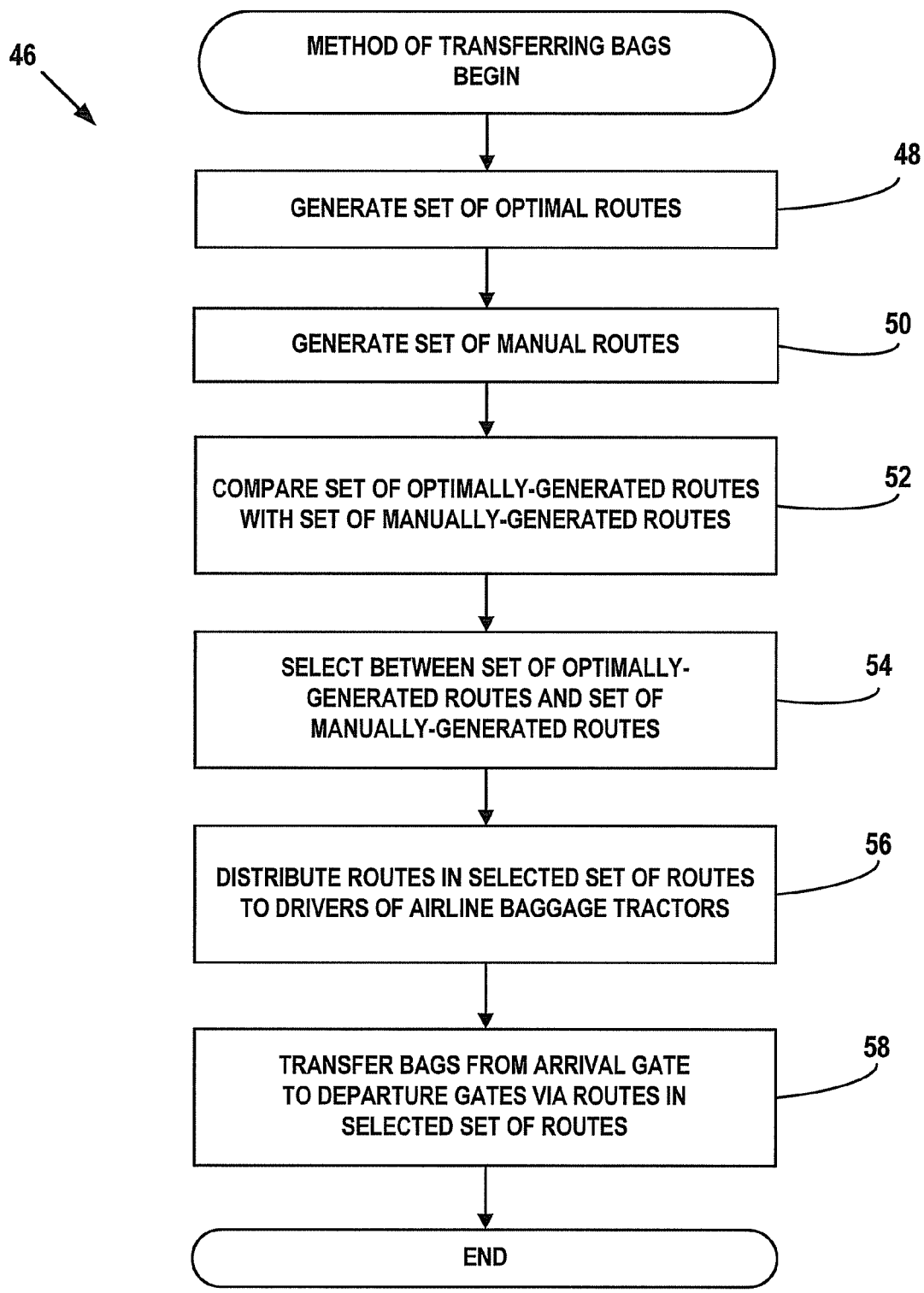
FIG. 5 is a flow chart illustration of a method of transferring the transfer bags of FIG. 1B, by operating the system of FIGS. 1A and 1B, according to an exemplary embodiment.

In an exemplary embodiment, as illustrated in FIG. 5 with continuing reference to FIGS. 1A-4, a method of transferring the transfer bags 34, by operating the system 10, is generally referred to by the reference numeral 46 and, in several exemplary embodiments, the method 46 is implemented by, or at least partially implemented by, the module 12 of the system 10, the user interface 20, the user interfaces 26a, 26b and 26c, and/or any combination thereof. The method 46 includes generating a set of optimal routes in step 48, generating a set of manual routes in step 50, comparing the set of optimally-generated routes with the set of manually-generated routes in step 52, selecting between the set of optimally-generated routes and the set of manually-generated routes in step 54, thereby selecting the transfer routes 38, 40 and 42 (as labeled in FIG. 1B), distributing the routes 38, 40 and 42 to drivers of the airline transfer baggage tractors 28a, 28b and 28c in step 56, and transferring the transfer bags 34 from the arrival gate 30 to the departures gates 36 via the routes 38, 40 and 42 in step 58.

In an exemplary embodiment, with continuing reference to FIGS. 1A-5, to generate a set of optimal routes in the step 48, a program such as, for example, a web browser, is executed by the processor 20b of the user interface 20, thereby causing the web browser to access a website hosted by the computer 14 of the module 12, which website provides access to, retrieves, processes, conditions, and/or graphically communicates, data stored in the computer readable medium 16 including, in several exemplary embodiments, data stored in the database 18, and/or which website includes, and/or is part of, one or more programs which provide access to, retrieve, process, condition, and/or graphically communicate, data stored in the computer readable medium 16 including, in several exemplary embodiments, data stored in the database 18. In an exemplary embodiment, the output device 20c includes a graphical display such as a monitor, and data, conditioned data, results of processed data, and/or any combination thereof, are displayed on the graphical display during at least a portion of the step 48.

Figure 6:
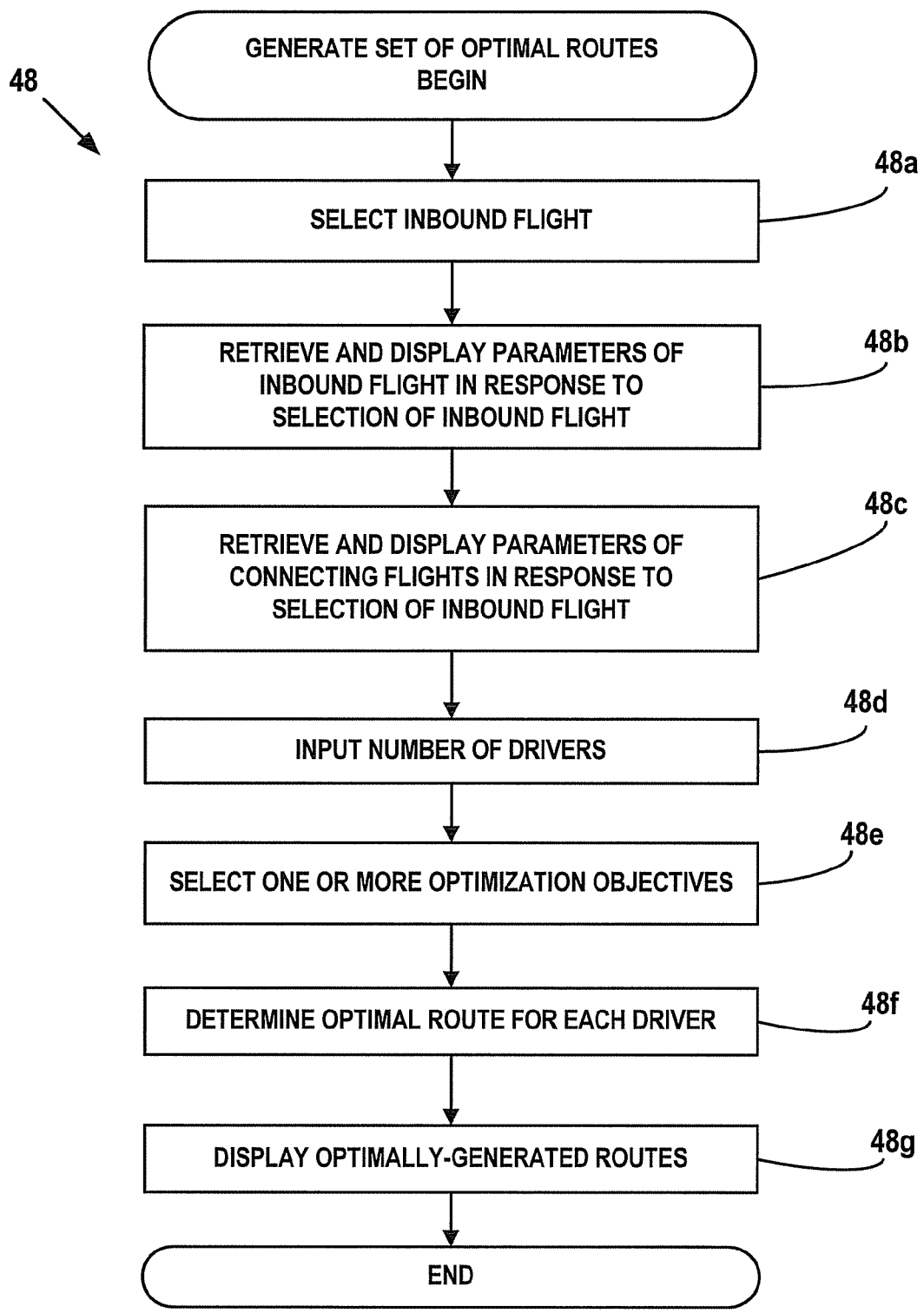
FIG. 6 is a flow chart illustration of a step of the method of FIG. 5, according to an exemplary embodiment.

In an exemplary embodiment, as illustrated in FIG. 6 with continuing reference to FIGS. 1A-5, to generate a set of optimal routes in the step 48, the inbound flight of the airplane 32 is selected in the step 48a, parameters of the inbound flight are retrieved and displayed on the output device 20c in step 48b in response to the selection in the step 48a, parameters of the connecting flights of the inbound flight are retrieved and displayed on the output device 20c in step 48c in response to the selection in the step 48a, the number of drivers available to drive one or more of the airline baggage tractors 28a, 28b and 28c is inputted in step 48d, one or more optimization objectives are selected in step 48e, an optimal route is determined for each driver in step 48f, and the optimally-generated results are displayed in step 48g.

Figure 7:
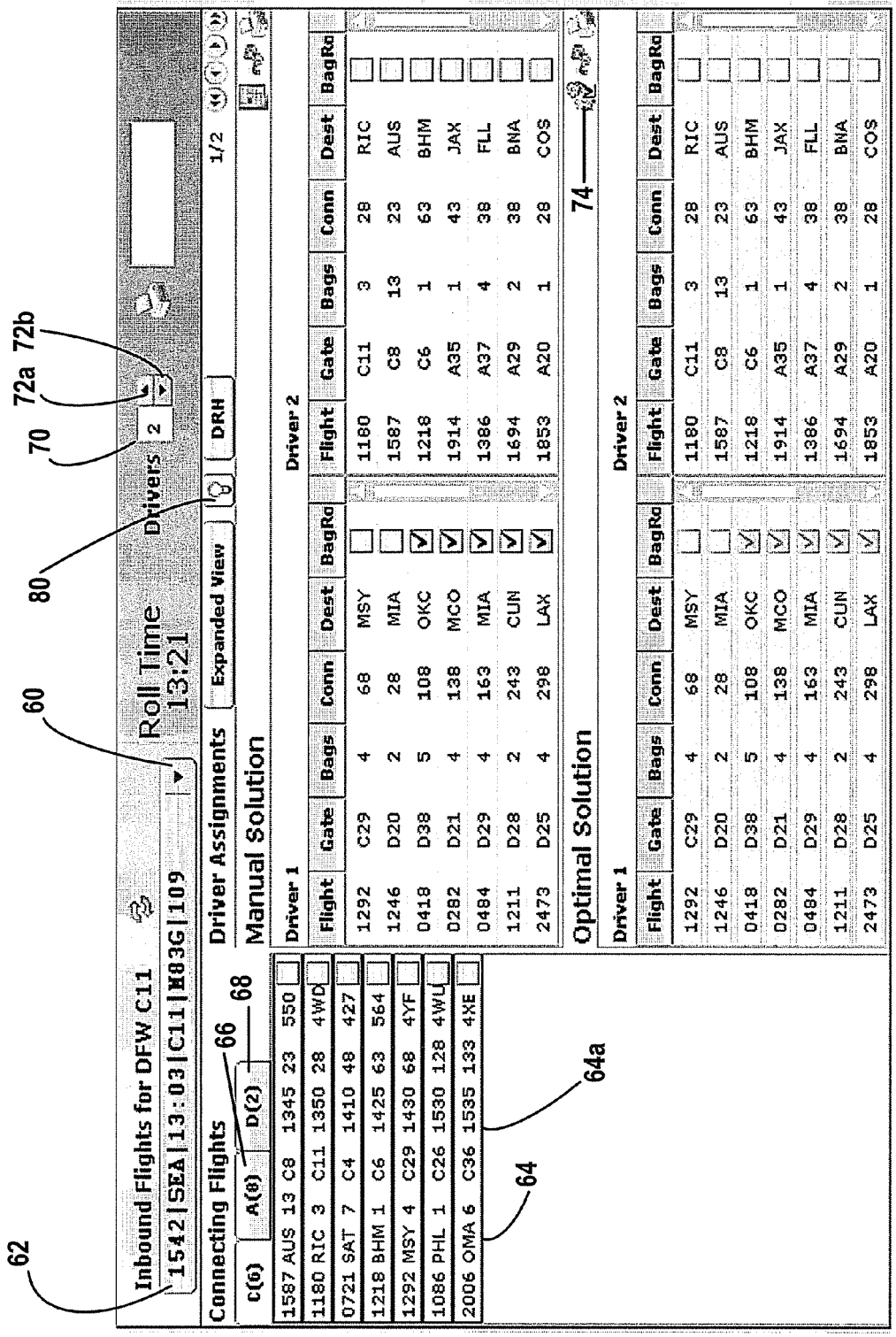

In an exemplary embodiment, as illustrated in FIG. 7 with continuing reference to FIGS. 1A-6, during the step 48a, a user such as, for example, a crew chief in the gate house 24, uses the input device 20d to select the inbound flight of the airplane 32 from, for example, a drop-down menu 60 on the website hosted by the computer 14, which retrieves and displays one or more parameters corresponding to one or more inbound flights. In response, during the step 48b, the parameters of the inbound flight of the airplane 32 are retrieved and displayed in a row 62 on the output device 20c, with the parameters including the inbound flight number, the departure location of the inbound flight, the gate number of the arrival gate 30, and the total quantity of the bags 34 on the inbound airplane 32. For example, as shown in FIG. 7, the parameters displayed in the row 62 indicate that the flight number of the inbound flight is 1542, the departure location of the inbound flight is Seattle, the gate number of the arrival gate 30 is C11, and the total quantity of the bags 34 on the inbound airplane 32 is 109.

In an exemplary embodiment, as illustrated in FIG. 7 with continuing reference to FIGS. 1A-6, in further response to the selection of the inbound flight of the airplane 32 from the drop-down menu 60 in the step 48a, during the step 48c, the respective parameters of the connecting flights of the inbound flight of the airplane 32 are retrieved and displayed in a plurality of rows 64, with each row in the plurality of rows 64 corresponding to a single connecting flight and including, for example, the connecting flight number, the connecting flight destination, the quantity of the transfer bags 34 to be transferred to the corresponding departure gate 36, the corresponding gate number of the departure gate 36, the estimated time of departure of the connecting flight, and the transfer time available to transfer bags to the departure gate 36 for loading onto the airplane of the connecting flight. For example, as shown in FIG. 7, the top row in the plurality of rows 64 indicates that, for one of the connecting flights, the flight number is 1587, the destination location of the connecting flight is Austin, the quantity of the transfer bags 34 to be transferred to the corresponding departure gate 36 of the outbound flight is 13, the gate number of the departure gate 36 is C8, the estimated time of departure is 13:45, and the transfer time available is 23 minutes. In an exemplary embodiment, during the step 48c, the plurality of rows 64 are divided into subgroups by the specific terminal from which the connecting flights are scheduled to depart. For example, as shown in FIG. 7, a subgroup 64a of the plurality of rows 64 is displayed on the output device 20c, with the subgroup 64a only including rows for connecting flights departing from Terminal C, and the subgroups of the plurality of rows 64 for additional terminals from which connecting flights are scheduled to depart, such as Terminals A and D, are accessed by selecting tabs 66 and 68, respectively.

In several exemplary embodiments, one or more of the parameters selected in the step 48a and/or retrieved and displayed in the steps 48b and/or 48c are accessed and/or retrieved from the module 12, the computer 14, the computer readable medium 16, the database 18, the user interface 20 and/or one or more of its components, one or more of the user interfaces 26a, 26b and 26c and/or one or more of their components, and/or any combination thereof. In several exemplary embodiments, one or more of the parameters selected in the step 48a and/or retrieved and displayed in the steps 48b and/or 48c are accessed and/or retrieved from one or more other databases, modules, storage devices, computers, memories, computer readable media, and/or any combination thereof. In several exemplary embodiments, one or more of the parameters selected in the step 48a and/or retrieved and displayed in the steps 48b and/or 48c include real-time information or data, conditioned real-time information or data, processed real-time information or data, and/or any combination thereof, which data is stored and continually updated in the module 12, the computer 14, the computer readable medium 16, the database 18, the user interface 20 and/or one or more of its components, one or more of the user interfaces 26a, 26b, 26c and/or one or more of their components, one or more other databases, modules, storage devices, computers, memories or computer readable media, and/or any combination thereof. In several exemplary embodiments, one or more of the parameters selected in the step 48a and/or retrieved and displayed in the steps 48b and/or 48c include data, conditioned data, processed data, and/or any combination thereof, which data is stored in the module 12, the computer 14, the computer readable medium 16, the database 18, the user interface 20 and/or one or more of its components, one or more of the user interfaces 26a, 26b, 26c and/or one or more of their components, one or more other databases, modules, storage devices, computers, memories or computer readable media, and/or any combination thereof. In several exemplary embodiments, the information or data retrieved in the steps 48b and 48c include information or data associated with the connecting flights of the inbound flight of the airplane 32 including, for example, the quantity of the transfer bags 34 to be delivered to each of the departure gates 36 from which the connecting flights are to depart, the status of each of the inbound flight and the connecting flights, and gate information for each of the inbound flight and the connecting flights such as, for example, the gate numbers for each of the arrival gate 30 and the departure gates 36. In several exemplary embodiments, at least a portion of the real-time information or data retrieved in the steps 48b and 48c is retrieved from an OB list in an enhanced reservation system (RES), with the OB list being automatically updated as passengers board the airplane 32 before the airplane 32 flies to the destination airport at which the arrival gate 30 is located.

In an exemplary embodiment, as illustrated in FIG. 7 with continuing reference to FIGS. 1A-6, to select or input the number of drivers in the step 48d, the number of drivers is selected or entered in an input box 70 and/or selected by clicking on and/or otherwise selecting an increase arrow icon 72a and/or a decrease arrow icon 72b.

Figure 8:
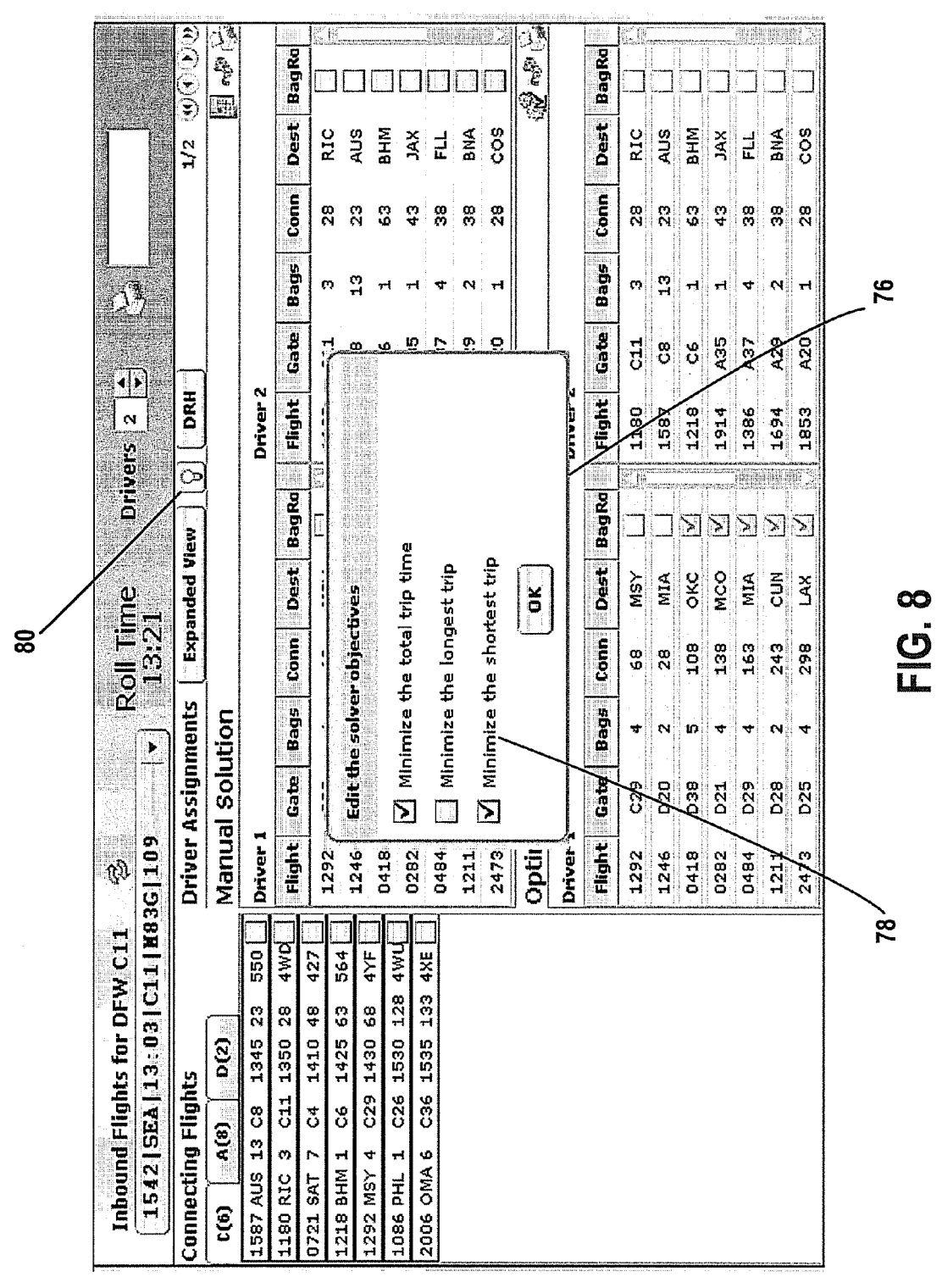

In an exemplary embodiment, as illustrated in FIGS. 7 and 8 with continuing reference to FIGS. 1A-6, to select one or more optimization objectives in the step 48e, a dialog icon 74 (FIG. 7) is clicked and/or otherwise selected and, in response, a dialog box 76 opens (FIG. 8), in which one or more of the optimization objectives are listed. In an exemplary embodiment, the optimization objectives include minimizing misconnected bags, which, in several exemplary embodiments, has highest priority, minimizing total driving time, minimizing the maximum trip time of all drivers, minimizing the minimum trip time of all drivers, minimizing bags that arrive to the gate within five minutes prior to departure time, and ensuring that bags dropped into a bag room (i.e., areas and/or rooms at which one or more of the transfer bags 34 are temporarily stored before being eventually transferred to their respective departure gates 36) have at least 60 minutes to connect to their departure flight. In an exemplary embodiment, the optimization objectives include one or more of minimizing misconnected bags, which, in several exemplary embodiments, has highest priority, minimizing total driving time, minimizing the maximum trip time of all drivers, minimizing the minimum trip time of all drivers, minimizing bags that arrive to the gate within five minutes prior to departure time, ensuring that bags dropped into a bag room have at least 60 minutes to connect to their departure flight, and/or any combination thereof. The one or more optimization objectives listed in the dialog box 76 are selected and/or de-selected and then the box 76 is closed. In an exemplary embodiment, the optimization objectives listed in the dialog box 76 are all selected by default, and specific objectives must be de-selected to not be included when the optimal routes are determined in the step 48f. In an exemplary embodiment, a subset 78 of the optimization objectives used in the step 48f are listed in the dialog box 76 and, as a result, only the optimization objectives listed in the subset 78 are selected and/or de-selected in the step 48e. For example, as shown in FIG. 8, two of the three optimization objectives included in the subset 78 are selected.

Figure 9:
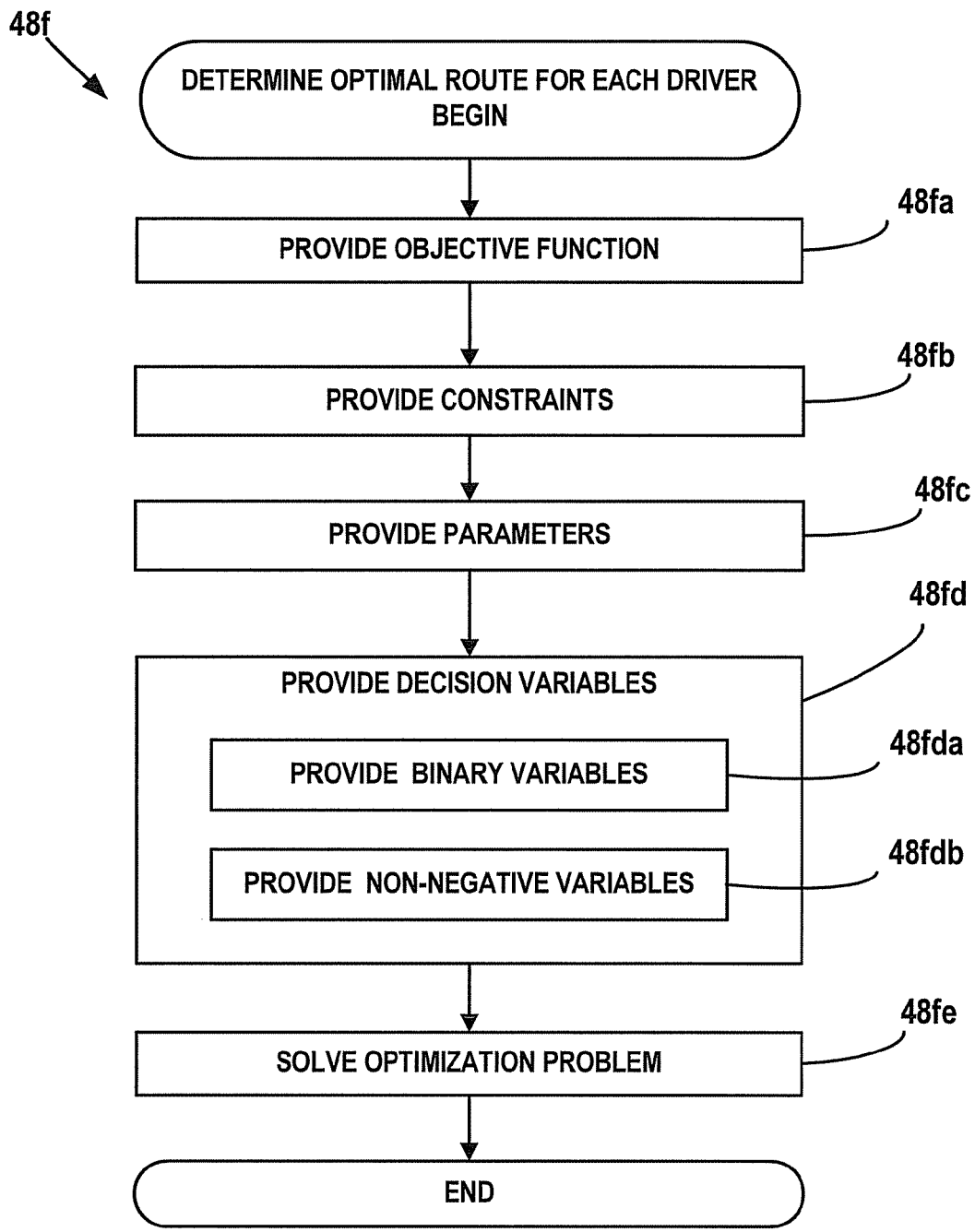
FIG. 9 is a flow chart illustration of a step of the step of generating a set of optimal routes of FIG. 6, according to an exemplary embodiment.

In an exemplary embodiment, as illustrated in FIG. 9 with continuing reference to FIGS. 1A-8, to determine the optimal route for each driver in the step 48f, objective functions are provided in step 48fa, constraints are provided in 48fb, parameters are provided in step 48fc, decision variables are provided in step 48fd, which includes providing binary variables in step 48fda and providing non-negative variables in step 48fdb, and the optimization problem is solved in step 48fe.

In an exemplary embodiment, providing the objective function in the step 48fa includes providing the objective function as given by the following:
Minimize
$w_1$ (number of missed bags)+$w_2$ (total trip time of all drivers)+
+$w_3$ (longest trip time among all drivers)+$w_4$ (shortest trip time among all drivers)+
+$w_5$ (number of bags delivered at gate within 5 minutes of departure time)+
+$w_6$ (number of bags delivered at bag room within 60 minutes of departure time),
where
$w_1$=weight assigned to minimize missed bags,
$w_2$=weight assigned to minimize total trip time,
$w_3$=weight assigned to minimize maximum trip time,
$w_4$=weight assigned to minimize minimum trip time,
$w_5$=weight assigned to minimize bags that arrive to gate within 5 minutes of departure time, and $w_6$=weight assigned to minimize bags dropped at bag room within 60 minutes of departure time;
and providing the constraints in the step 48fb includes providing the following constraints:
  a each of the respective drivers of the airline baggage tractors 28a, 28b and 28c must start and end his or her route at the arrival gate 30 of the inbound flight of the airplane 32,
  each stop (or each of the departure gates 36) is assigned to only one driver,
  all stops (or all of the departure gates 36) are covered by a driver, and
  a the distances between the stops (or the departure gates 36) and the time needed to unload the corresponding quantity of the transfer bags 34 at each stop are used to calculate the trip time.

More particularly, the objective function provided in the step 48fa is given by the following expression:
Minimize $$w_1 \sum_{i \in S} \text{missed}_i \cdot B_i + w_2 \sum_{k \in N} \text{Trip}_k + w_3 Tmax + w_4 Tmin +$$
$$w_5 \sum_{i \in Sgate} \text{critical\_gate}_i \cdot B_i + w_6 \sum_{i \in Sbagroom} \text{critical\_bagroom}_i \cdot B_i;$$

the constraints provided in the step 48fb are given by the following expressions:

$$\sum_{j \in S \setminus \{A\}} x_{A,j,k} \leq 1, \qquad \forall k \in N$$

-continued $$\sum_{i \in S \setminus \{s\}} x_{i,s,k} = \sum_{j \in S \setminus \{s\}} x_{s,j,k}, \quad \forall s \in S, \forall k \in N$$

$$\sum_{j \in S \setminus \{i\}, k \in N} x_{i,j,k} = 1 \quad \forall i \in S \setminus \{A\}$$

$$\sum_{i \in S1, j \in S1 \setminus \{i\}} x_{i,j,k} \leq |S1| - 1, \quad \forall S1 \subset S \setminus \{A\}, k \in N$$

$t_A = 0$, $t_j \geq t_i + T_{i,j} \cdot x_{i,j,k} - (1 - x_{i,j,k}) \cdot M, \forall i \in S, j \in S \setminus \{A\}, k \in N$ $\text{Trip}_k \geq t_i + T_{i,A,k} \cdot x_{i,A,k} - (1 - x_{i,A,k}) \cdot M, \forall i \in S \setminus \{A\}, k \in N$ $T\max = \max(\text{Trip}_1, \ldots, \text{Trip}_n)$, $T\min = \min(\text{Trip}_1, \ldots, \text{Trip}_n)$, $\text{Missed}_i \cdot M \geq t_i - C_i, \forall i \in S$ $\text{critical\_gate}_i \cdot M \geq t_i - C_i - 5, \forall i \in S\text{gate}$ $\text{critical\_bagroom}_i \cdot M \geq t_i - C_i - 60, \forall i \in S\text{bagroom};$ the parameters provided in the step 48*fc* are given by the following expressions:
A=starting/ending stop for the route (arrival gate),
n=number of drivers,
N=set of all drivers (1, 2, ..., n),
M=big integer value,
S=set of all stops (all departure gates/bag rooms and A),
Sgate=set of all gate stops (Sgate ⊂ S),
Sbagroom=set of bag room all stops (Sbagroom ⊂ S),
$C_i$=connection time in minutes from roll time for stop I,
$B_i$=number of bags for stop i,
$\text{Wait}_i$=waiting time in minutes at stop i,
$D_{i,j}$=distance between stop i and stop i,
unload_rate=time in minutes used to unload one bag at the stop,
$T_{i,j}$=travel time between stop i and stop j plus unloading/waiting time at stop j, and
$T_{i,j} = D_{i,j}/\text{speed} + \text{Wait}_j + \text{unload\_rate } B_j$;
the binary variables provided in the step 48*fda* are given by the following expressions:
$X_{i,j,k}$=1 if driver k delivers to stop j immediately after stop i and 0 otherwise,
missed$_i$=1 if bags for stop i are missed and 0 otherwise,
critical_gate$_i$=1 if bags for gate stop i are delivered within 5 minutes of departure time and 0 otherwise for $\forall i \in$ Sgate, and
critical_bagroom$_i$=1 if bags for bag room stop i are delivered within 60 minutes of departure time and 0 otherwise for $\forall i \in$ Sbagroom;
and the non-negative variables provided in the step 48*fdb* are given by the following expressions:
$t_i$=minutes after roll time a driver finishes unloading at stop I,
$\text{Trip}_k$=trip time for driver k,
Tmax=maximum trip time among all drivers, and
Tmin=minimum trip time among all drivers.

In an exemplary embodiment, the step 48*f* is executed in response to clicking on and/or otherwise selecting a calculation icon 80, which is shown in, inter alia, FIGS. 7 and 8. In an exemplary embodiment, one or more of the steps 48*fa*, 48*fb*, 48*fc*, 48*fd* and 48*fe*, and/or any combination thereof, are executed in response to clicking on and/or otherwise selecting the calculation icon 80.

In an exemplary embodiment, to solve the optimization problem in the step 48*fe*, a genetic algorithm is employed.

Figure 10:
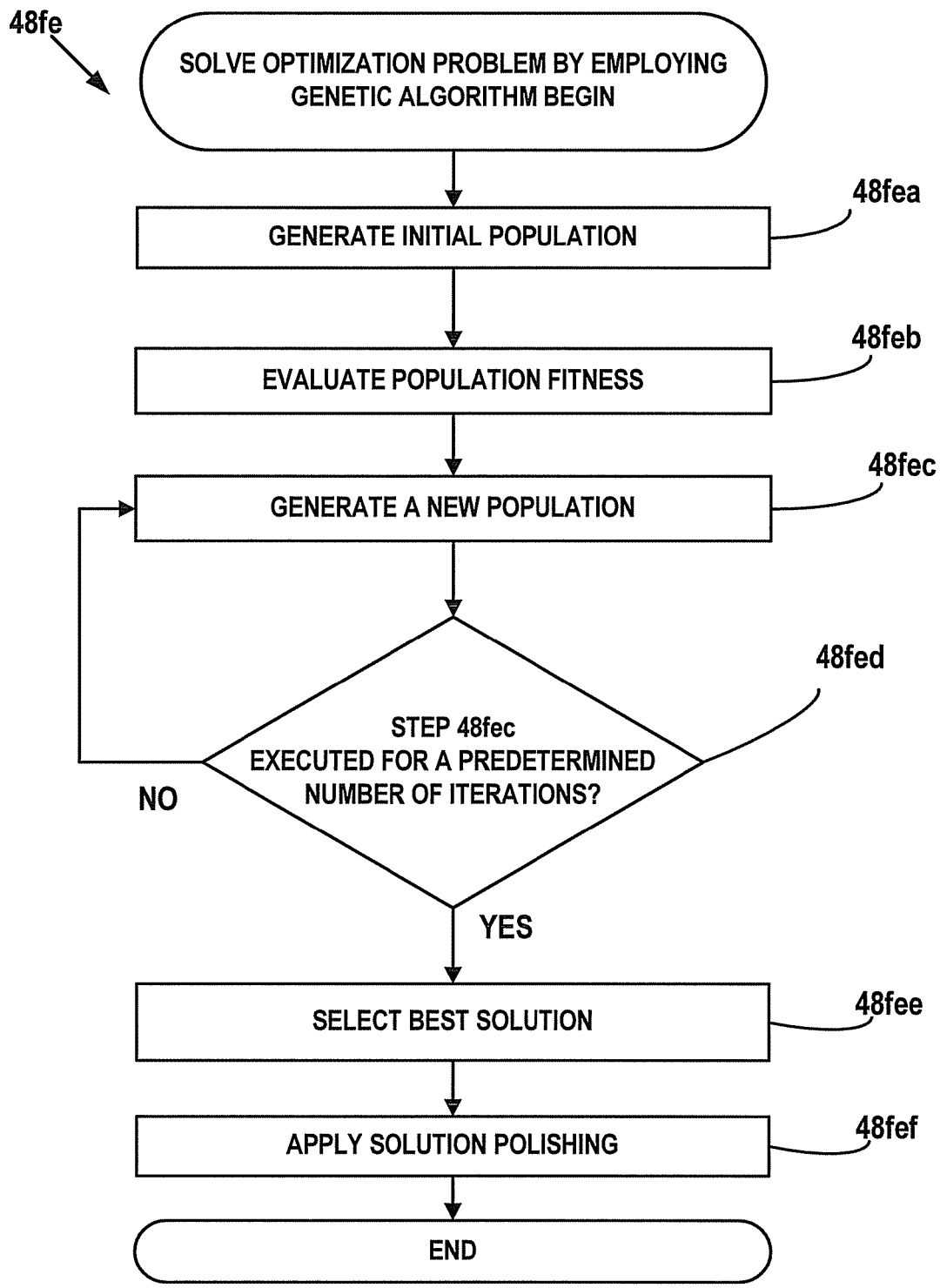
FIG. 10 is a flow chart illustration of a step of the step of FIG. 9, according to an exemplary embodiment.
Figure 11:
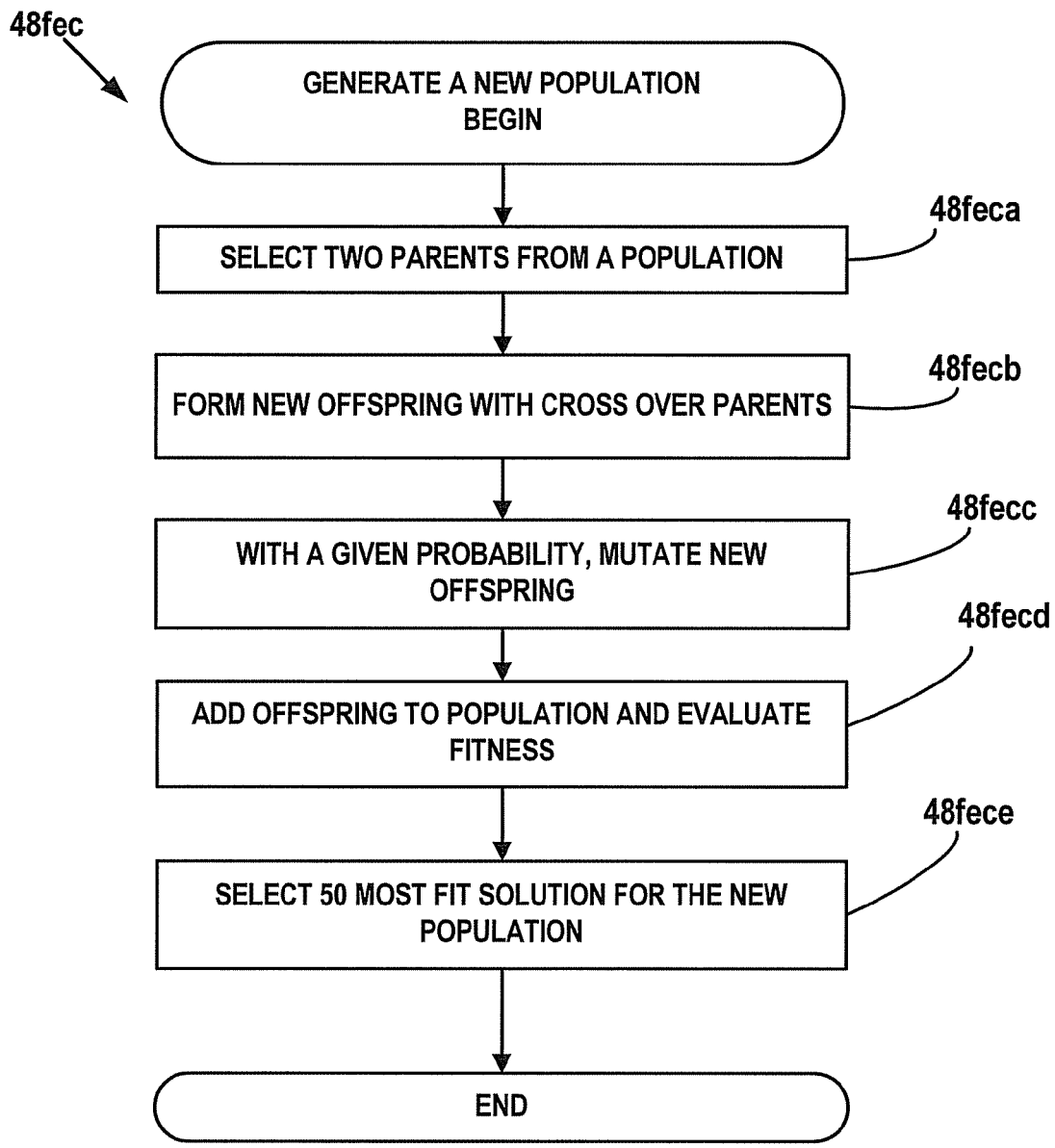
FIG. 11 is a flow chart illustration of a step of the step of FIG. 10, according to an exemplary embodiment.

In an exemplary embodiment, as illustrated in FIGS. 10 and 11 with continuing reference to FIGS. 1A-9, to solve the optimization problem in the step 48*fe*, a genetic algorithm is employed by generating an initial population in step 48*fea*, evaluating initial population fitness in step 48*feb*, and generating a new population in step 48*fec*. As shown in FIG. 11, to generate a new population in the step 48*fec*, two parents from a population are selected in step 48*feca* (where the selection probability is proportional to fitness), new offspring are formed using cross over parents in step 48*fecb*, new offspring is mutated with a given probability in step 48*fecc*, offspring is added to the population and the fitness is evaluated in step 48*fecd*, and the 50 most fit solution for the new population is selected in step 48*fece*. As shown in FIG. 10, in step 48*fed*, it is determined whether the step 48*fec* has been executed for a predetermined number of iterations; if not, then the step 48*fec* is repeated until the step 48*fec* has been executed for the predetermined number of iterations, after which the best solution is selected in step 48*fee*, and solution polishing is applied in step 48*fef*.

In view of the foregoing, it is clear that, during the step 48, weights are assigned to all of the optimization objectives in order to prioritize the importance of each objective. Further, the distances between the departure gates 36, the distance between the arrival gate 30 and one or more of the departure gates 36, the electric tug speed of the airline baggage tractors 28*a*, 28*b* and 28*c*, the rate of loading the transfer bags 34 onto the respective airplanes at the respective departure gates 36, the rate of unloading the transfer bags 34 from the airplane 32, the expected waiting time at one or more bag rooms (i.e., areas and/or rooms at which one or more of the transfer bags 34 are temporarily stored before being eventually transferred to their respective departure gates 36), and/or any combination thereof, ensure the accuracy of the optimal routes determined in the step 48*f*.

In an exemplary embodiment, as illustrated in FIG. 12 with continuing reference to FIGS. 1A-11, to display the optimally-generated routes in the step 48*g* of the step 48 of the method 46, a plurality of groups, or pluralities, 82 of rows are displayed on the output device 20*c*, with the number of groups in the plurality of groups 82 of rows being equal to the number of drivers inputted in the step 48*d* of the step 48 of the method 46. For example, if three (3) drivers are inputted in the step 48*d*, then three groups 82 of rows are displayed on the output device 20*c* in the step 48*g*, which three groups of rows will be referred to by the reference numerals 82*a*, 82*b* and 82*c*, as shown in FIG. 12. The optimal routes displayed in the groups 82*a*, 82*b* and 82*c* in the step 48*g* are determined in the step 48*f*.

As shown in FIG. 12, the group 82*b* of rows represents the optimal route for the driver of the airline baggage tractor 28*b*, with each row in the group 82*b* being a specific stop, or the specific departure gate 36, along the optimal route and including one or more data parameter fields associated with the specific stop (or the specific departure gate 36), namely a flight number data parameter field 82*ba* identifying the flight number of the connecting flight departing from the specific departure gate 36, a departure gate data parameter field 82*bb* identifying the gate number of the specific departure gate 36, a bags data parameter field 82*bc* indicating the quantity of the transfer bags 34 to be transferred to the specific departure gate 36, a transfer time data parameter field 82*bd* indicating the transfer time available to transfer bags to the specific departure gate 36 for loading onto the airplane of the connecting flight, a destination data parameter field 82*be* identifying the destination location of the connecting flight, and a bag room use data parameter field 82*bf* displaying a code that indicates whether the transfer bags 34 to be transferred to the specific departure gate 36 are to be temporarily stored in a bag room before arriving at the specific departure gate 36; in an exemplary embodiment, the code in the field 82*bf* is a check mark if the transfer bags 34 are to be temporarily stored in a bag room, and the code is a blank space if the transfer bags 34 are not to be temporarily stored in a bag room.

The top row in the group 82*b* is the first stop or departure gate 36 along the optimal route to be traveled to by the driver of the airline baggage tractor 28*b*, the second-to-the-top row in the group 82*b* is the second stop or departure gate 36 along the optimal route to be traveled to by the driver of the airline baggage tractor 28*b*, and so on, with the bottom row in the group 82*b* being the last stop or departure gate 36 along the optimal route to be traveled to by the driver of the airline baggage tractor 28*b*.

The groups 82*a* and 82*c* of rows represent the optimal routes for the drivers of the airline baggage tractors 28*a* and 28*c*, respectively, and are substantially similar to the group 82*b* of rows. Therefore, the groups 82*a* and 82*c* of rows will not be described in further detail.

In an exemplary embodiment, as illustrated in FIG. 13 with continuing reference to FIGS. 1A-12, to generate a set of manual routes in the step 50, the user such as, for example, the crew chief in the gate house 24, uses the input device 20*d* to input and/or otherwise select connecting flights to generate a plurality of groups, or pluralities, 84 of rows, and the groups 84 of rows are displayed on the output device 20*c*, with the number of groups in the plurality of groups 84 of rows being equal to the number of drivers inputted in the step 48*d* of the step 48 of the method 46. For example, if three (3) drivers are inputted in the step 48*d*, then three groups 84 of rows are displayed on the output device 20*c* in the step 50, which three groups of rows will be referred to by the reference numerals 84*a*, 84*b* and 84*c*, as shown in FIG. 13. The top row in the group 84*b* is the first stop or departure gate 36 along the manual route to be traveled to by the driver of the airline baggage tractor 28*b*, the second-to-the-top row in the group 84*b* is the second stop or departure gate 36 along the manual route to be traveled to by the driver of the airline baggage tractor 28*b*, and so on, with the bottom row in the group 84*b* being the last stop or departure gate 36 along the manual route to be traveled to by the driver of the airline baggage tractor 28*b*. The data parameter fields in each of the rows in the group 84*b* of rows are substantially similar to the data parameter fields in each of the rows in the group 82*b* of rows and therefore the data parameter fields in each of the rows in the group 84*b* of rows will not be described in detail. The groups 84*a* and 84*c* of rows represent the manual routes for the drivers of the airline baggage tractors 28*a* and 28*c*, respectively, and are substantially similar to the group 84*b* of rows. Therefore, the groups 84*a* and 84*c* of rows will not be described in further detail. In several exemplary embodiments, the manual routes displayed in the groups 84*a*, 84*b* and 84*c* are generated based on the user's preferences and/or knowledge.

In an exemplary embodiment, to generate the set of manual routes in the step 50 of the method 46, the optimal routes displayed in the groups 82*a*, 82*b* and 82*c* of rows are also initially displayed as the manual routes in the groups 84*a*, 84*b* and 84*c* of rows, and the order of the rows in the groups 84*a*, 84*b* and 84*c* are then modified, rearranged, edited and/or otherwise changed by, for example, using the input device 20*d* to, for example, drag and/or drop the rows.

In an exemplary embodiment, as illustrated in FIG. 14 with continuing reference to FIGS. 1A-13, to compare the set of optimally-generated routes with the set of manually-generated routes in the step 52 of the method 46, a comparison calculation icon 86 is clicked and/or otherwise selected and, in response, the website and/or one or more other computer programs determine one or more differences in parameters between the optimally-generated routes in the group 82 and the manually-generated routes in the group 84, such as, for example, the differences in trip times, already-missed bags, missed bags, bags which must be transferred in less than five minutes, stops, and number of bags. In further response, one or more parameters corresponding to the sum of the differences between the optimally-generated routes in the groups 82*a*, 82*b* and 82*c*, and the manually-generated routes in the groups 84*a*, 84*b* and 84*c*, respectively, are displayed in a row 88 on the output device 20*c*, the row 88 including a total time difference data parameter field 88*a*, a missed bags data parameter field 88*b*, and a critical bags data parameter field 88*c*.

Figure 15:
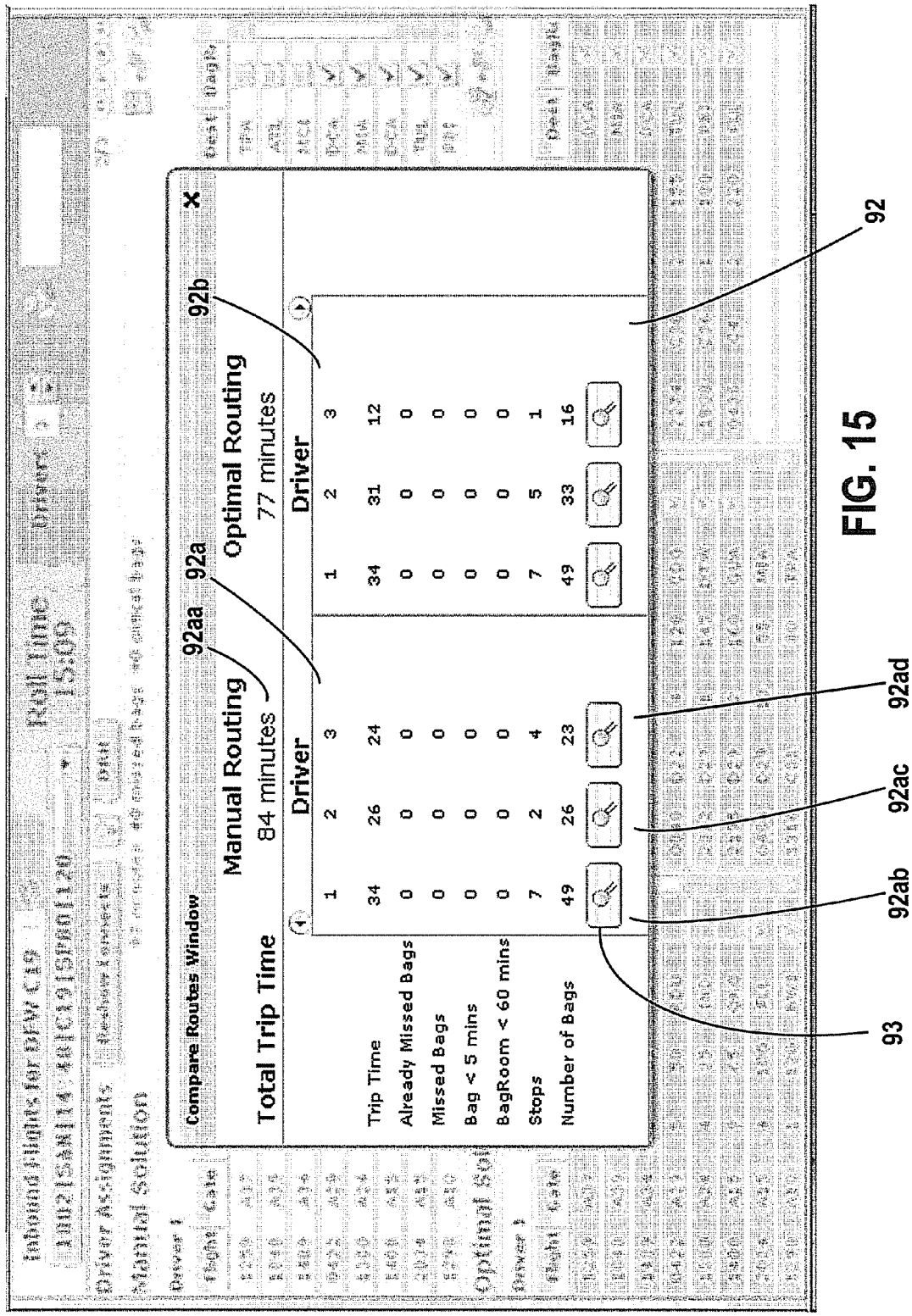

In an exemplary embodiment, as illustrated in FIGS. 14 and 15 with continuing reference to FIGS. 1A-13, to compare the set of optimally-generated routes with the set of manually-generated routes in the step 52 of the method 46, the comparison calculation icon 86 is clicked and/or otherwise selected and, in response, the website and/or one or more other computer programs determine one or more differences in parameters between the optimally-generated routes in the group 82 and the manually-generated routes in the group 84, such as, for example, the differences in trip times, already-missed bags, missed bags, bags which must be transferred in less than five minutes, stops, and number of bags. A detailed comparison icon 90 is clicked and/or otherwise selected and, in response, a dialog box 92 (FIG. 15) is displayed on the output device 20*c*, the dialog box 92 including data parameter field groups 92*a* and 92*b*, the group 92*a* displaying parameters corresponding to the set of manually-generated routes and the group 92*b* displaying parameters corresponding to the set of optimally-generated routes. The group 92*a* includes a total trip time data parameter field 92*aa*, and columns 92*ab*, 92*ac* and 92*ad* of data parameter fields, each column including data parameters for one of the drivers of the airline baggage tractors 28*a*, 28*b* and 28*c* including, for example, trip time, already-missed bags, missed bags, bags which must be transferred in less than five minutes, bags to be temporarily stored in a bag room for less than 60 minutes, stops, and number of bags. In an exemplary embodiment, each of the columns 92*ab*, 92*ac* and 92*ad* includes a view route icon 93, which, when clicked and/or otherwise selected, displays the respective plurality of rows 84*a*, 84*b* and 84*c*. The group 92*b* is substantially similar to the group 92*a* and therefore will not be described in detail.

In an exemplary embodiment, and as noted above, after comparing the set of optimally-generated routes with the set of manually-generated routes in the step 52 of the method 46, one set of routes (optimally generated or manually generated) is selected in the step 54, which selected routes correspond to the transfer routes 38, 40 and 42 shown in FIG. 1B, and the selected routes 38, 40 and 42 are distributed to the respective drivers of the airline baggage tractors 28*a*, 28*b* and 28*c* in the step 56.

To distribute the routes 38, 40 and 42 in the step 56, the selected routes are printed out and physically transferred to the drivers of the airline baggage tractors 28*a*, 28*b* and 28*c*. In an exemplary embodiment, each print-out of the routes 38, 40 and 42 looks substantially similar to one of the groups of rows 82 or 84. Instead of, or in addition to printing out and physically transferring the routes 38, 40 and 42 to the drivers of the airline baggage tractors 28a, 28b and 28c in the step 56, the routes 38, 40 and 42 are downloaded or otherwise transmitted in whole or in part from one or more of the user interface 20, the computer 14, the computer readable medium 16, and the database 18, to the user interfaces 26a, 26b and 26c in the step 56. Instead of, or in addition to one or more of printing out and/or transmitting the routes 38, 40 and 42 in the step 56, the routes 38, 40 and 42 are accessed with the user interfaces 26a, 26b and 26c in the step 56.

Figure 16:
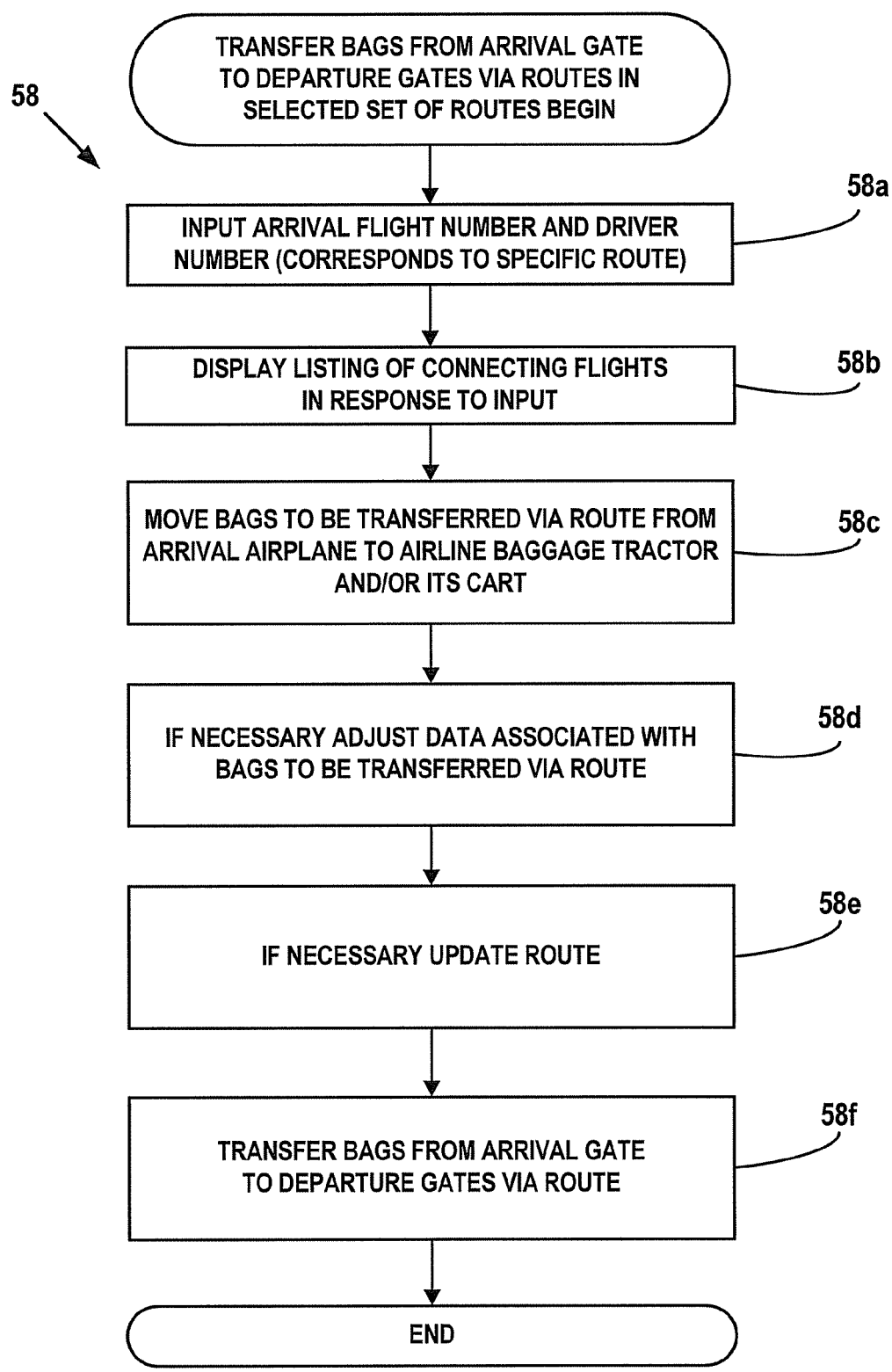
FIG. 16 is a flow chart illustration of another step of the method of FIG. 5, according to an exemplary embodiment.

In an exemplary embodiment, as illustrated in FIG. 16 with continuing reference to FIGS. 1A-15, to transfer the bags 34 from the arrival gate 30 to the departure gates 36 via the routes 38, 40 and 42, respectively, in the step 58, a plurality of steps is executed for each of the routes 38, 40 and 42. In an exemplary embodiment, for each one of the routes 38, 40 and 42, at least a portion of the step 58 is executed before, during or after at least respective portions of the step 58 are executed for the others of the routes 38, 40 and 42. In an exemplary embodiment, the step 58 is executed for each of the routes 38, 40 and 42 simultaneously or almost simultaneously.

For the purpose of clarity, the step 58 will be discussed with respect to the route 38, the airline baggage tractor 28a, and the user interface 26a. The execution of the step 58 with the route 38, the airline baggage tractor 28a, and the user interface 26a is substantially similar to the execution of the step 58 with the route 40, the airline baggage tractor 28b, and the user interface 26b, respectively, and is substantially similar to the execution of the step 58 with the route 42, the airline baggage tractor 28c, and the user interface 26c, respectively.

As shown in FIG. 16, the step 58 includes inputting the flight number of the arrival flight of the airplane 32 and the driver number (which corresponds to a specific one of the routes such as the route 38) in step 58a, displaying a listing of the connecting flights departing from the stops in the route 38 in step 58b in response to the step 58a, moving the transfer bags 34 to be transferred to the various departure gates 36 via the route 38 off of the airplane and onto the airline baggage tractor 28a and/or its cart in step 58c, if necessary adjusting data associated with the bags 34 to be transferred via the route 38 in step 58d, if necessary updating the route 38 in step 58e, and transferring the bags 34 to the various departure gates 36 via the route 38 in step 58f.

Figure 17:
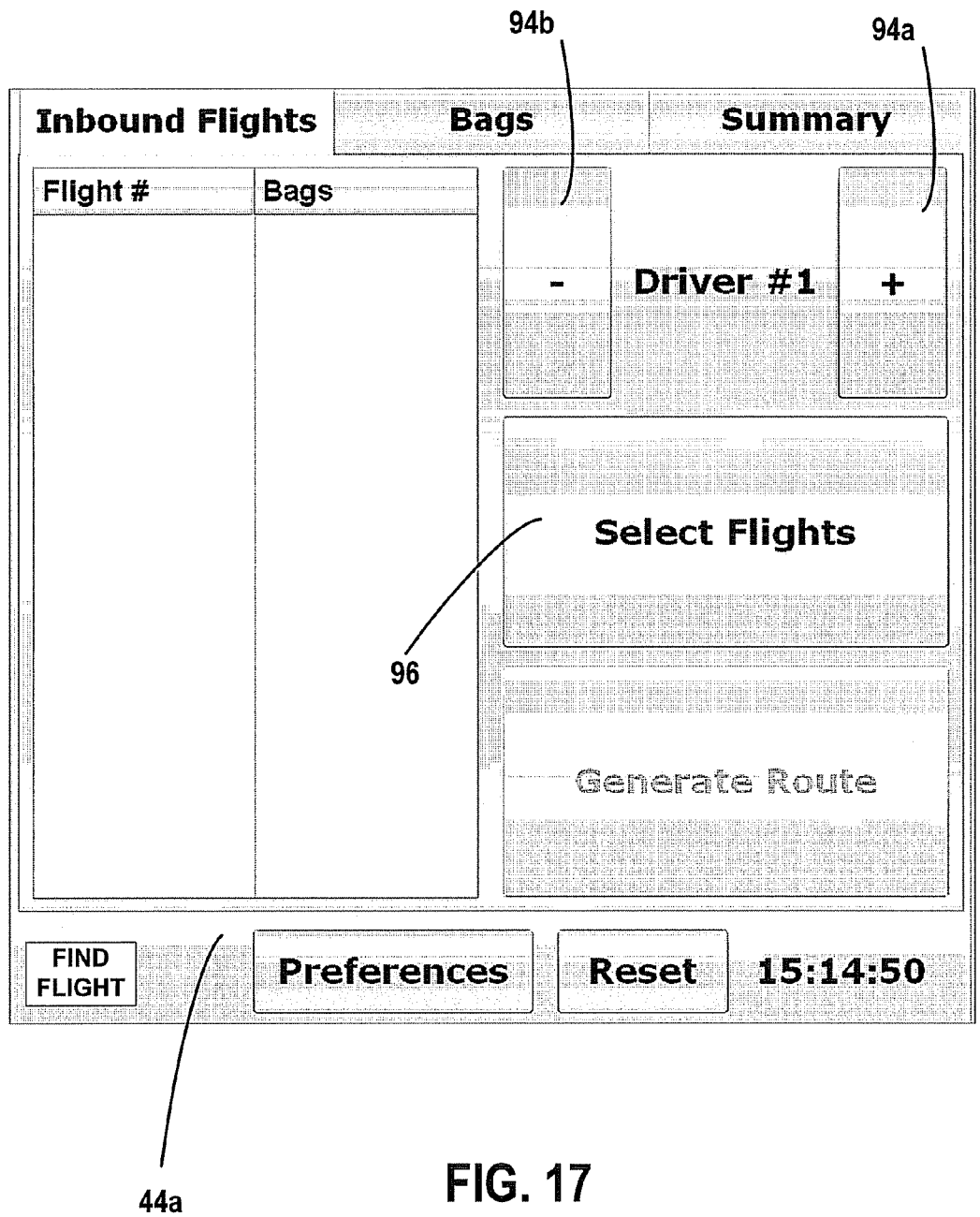
FIGS. 17, 18, 19, 20, 21, 22 and 23 are diagrammatic illustrations of portions of output generated during the step of FIG. 16, according to respective exemplary embodiments.
Figure 18:
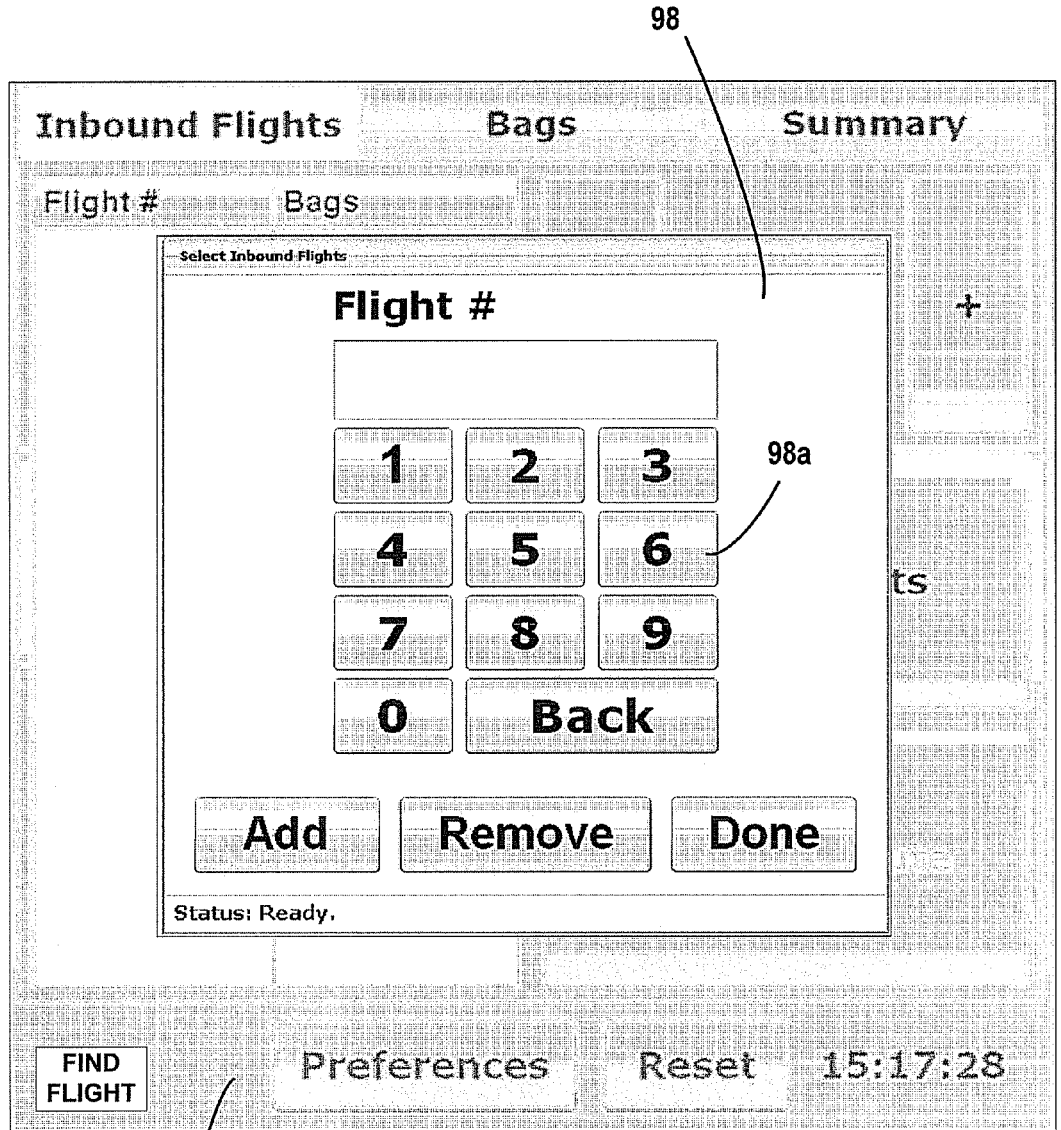

In an exemplary embodiment, as illustrated in FIGS. 17 and 18 with continuing reference to FIGS. 1A-16, to input the flight number of the arrival flight of the airplane 32 and the driver number which corresponds to the route 38 in the step 58a, a driver number increase icon 94a and/or a driver number decrease icon 94b on the screen 44a of the tablet personal computer 44 of the user interface 26a are touched and/or otherwise selected until the correct driver number, in this case driver #1, is displayed on the screen 44a. Moreover, a select flight icon 96 is touched and/or otherwise selected, which, in response, causes a dialog box 98 having a touch-screen keypad 98a (FIG. 18) to be displayed on the screen 44a, and the flight number of the arrival flight of the airplane 32 is inputted with the keypad 98a to select the arrival flight.

Figure 19:
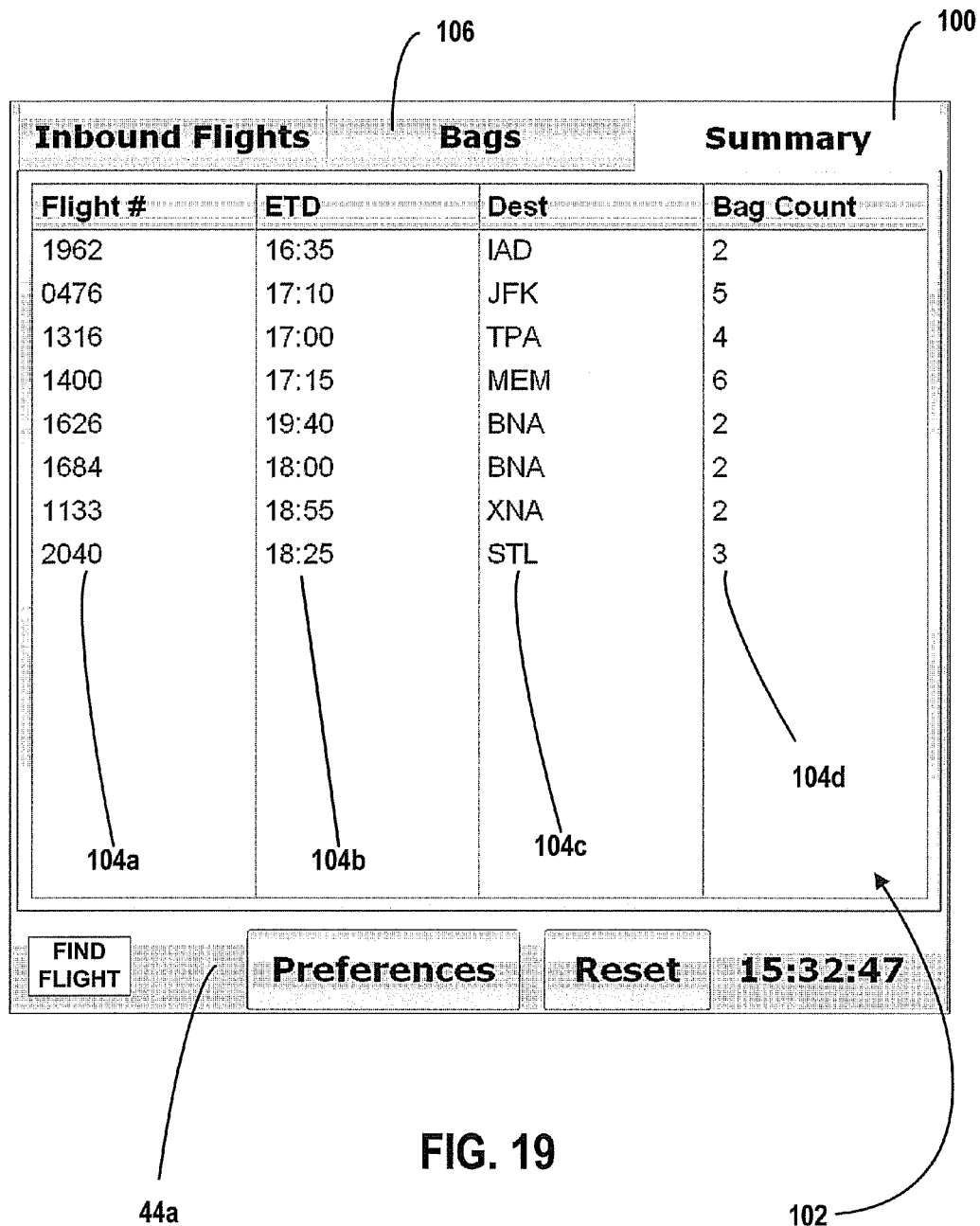

In an exemplary embodiment, as illustrated in FIG. 19 with continuing reference to FIGS. 1A-18, to display the listing of the connecting flights departing from the stops in the route 38 in the step 58b, a summary tab 100 on the screen 44a is touched and/or otherwise selected and, in response, a listing of the connecting flights departing from the stops in the route 38, in the form of a plurality of rows 102, is displayed on the screen 44a. Each row in the plurality of rows 102 includes a flight number data parameter field 104a identifying the flight number of the connecting flight, an estimated time of departure data parameter field 104b indicating the estimated time of departure of the connecting flight, a destination data parameter field 104c identifying the destination of the connecting flight, and a bag count data parameter field 104d indicating the quantity of the bags 34 to transferred onto the connecting flight.

In an exemplary embodiment, during or after the step 58b, the driver of the airline baggage tractor 28a compares the listing of the connecting flights departing from the stops in the route 38 displayed in the step 58b with the print-out of the route 38 distributed in the step 56.

In an exemplary embodiment, before, during and/or after the steps 58a and/or 58b, the bags 34 to be transferred via the route 38 are unloaded off of the airplane 32 and transferred onto the airline baggage tractor 28a and/or its cart in the step 58c.

In an exemplary embodiment, during the step 58c, one or more of the drivers unloading the transfer bags 34 off of the airplane 32 may determine that the quantity of bags 34 to be transferred to a specific departure gate 36 needs to be adjusted. That is, some of the bags 34 may not have been loaded onto the airplane 32 at its departure location, and/or additional bags scheduled to be transported on one or more of the connecting flights departing from one or more of the departure gates 36 may have been loaded onto the airplane 32 at its departure location, but a record of such loading may not have been made and/or inputted into any database, module, computer readable medium or memory, computer, storage device, node, and/or any combination thereof. If the quantity of the bags 34 to be transferred to a specific gate departure 36 via the route 38 needs to be modified, then data associated with the bags 34 to be transferred via the route 38 is adjusted in the step 58d by, in several exemplary embodiments, touching and/or otherwise selecting a bags tab 106 (FIG. 19) on the screen 44a.

Figure 20:
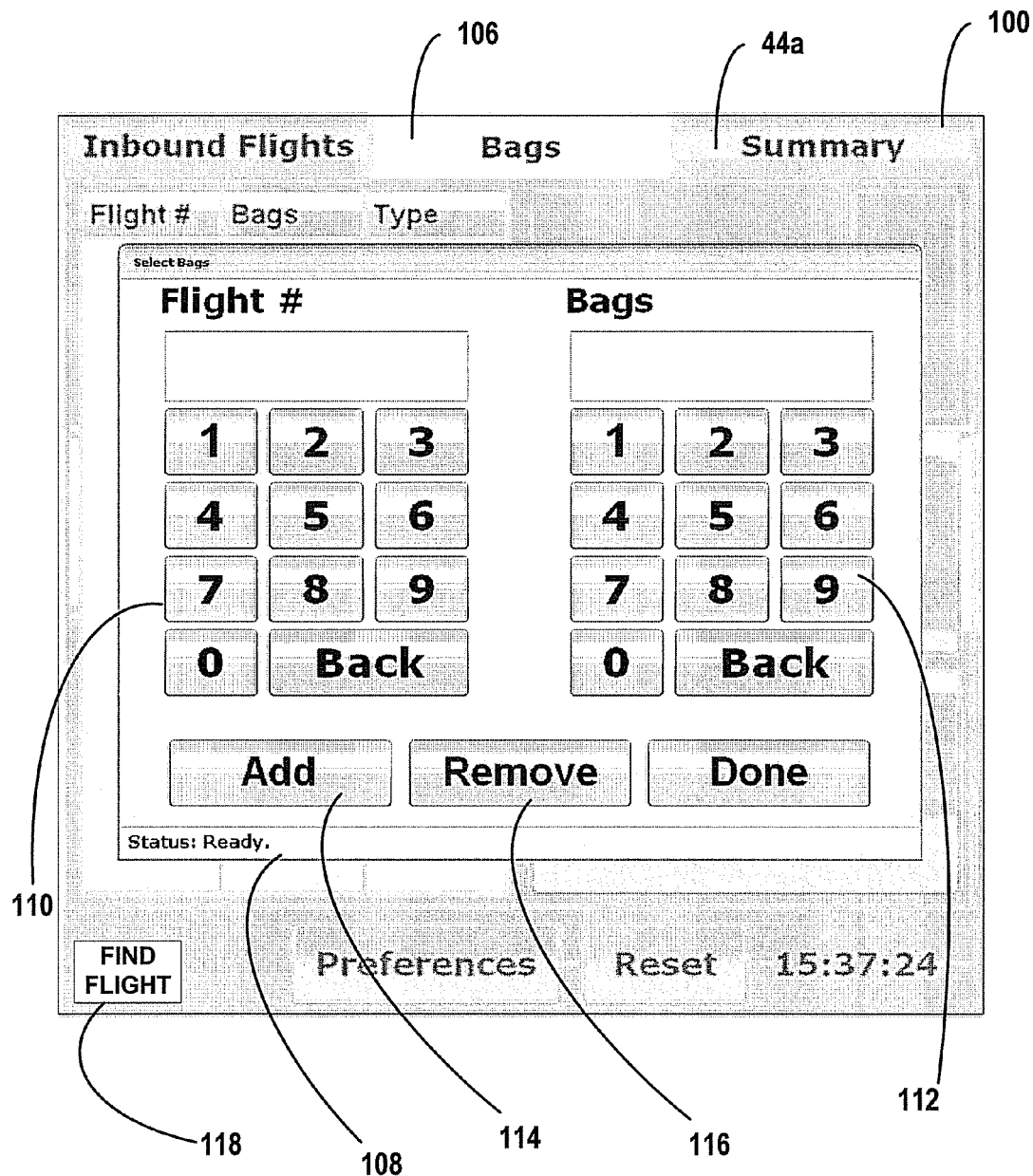

In an exemplary embodiment, as illustrated in FIG. 20 with continuing reference to FIGS. 1A-19, during the step 58d, in response to touching and/or otherwise selecting the bags tab 106 on the screen 44a, a select bags dialog box 108 is displayed on the screen 44a and includes a keypad 110 by which the flight number for a connecting flight number is inputted in the step 58d, and a keypad 112 by which the quantity of the bags 34 to be transferred to the connecting flight is modified or updated in the step 58d by inputting the quantity of the bags 34 and then either touching and/or otherwise selecting an add button 114 to add the quantity inputted with the keypad 112, or touching and/or otherwise selecting a remove button 116 to remove the quantity inputted with the keypad 112.

In an exemplary embodiment, during the step 58d, the connecting flight to which a bag 34 is to be transferred is determined by reviewing the bag tag coupled to the bag by, for example, scanning the bar code on the bag tag, reviewing the flight number on the bag tag, reviewing the destination location on the bag tag, reviewing the connecting flight information on the bag tag, and/or any combination thereof.

In an exemplary embodiment, during the step 58d, flight information for a particular flight, such as a connecting flight, is determined by touching and/or otherwise selecting a find flight button 118 displayed on the screen 44a.

Figure 21:
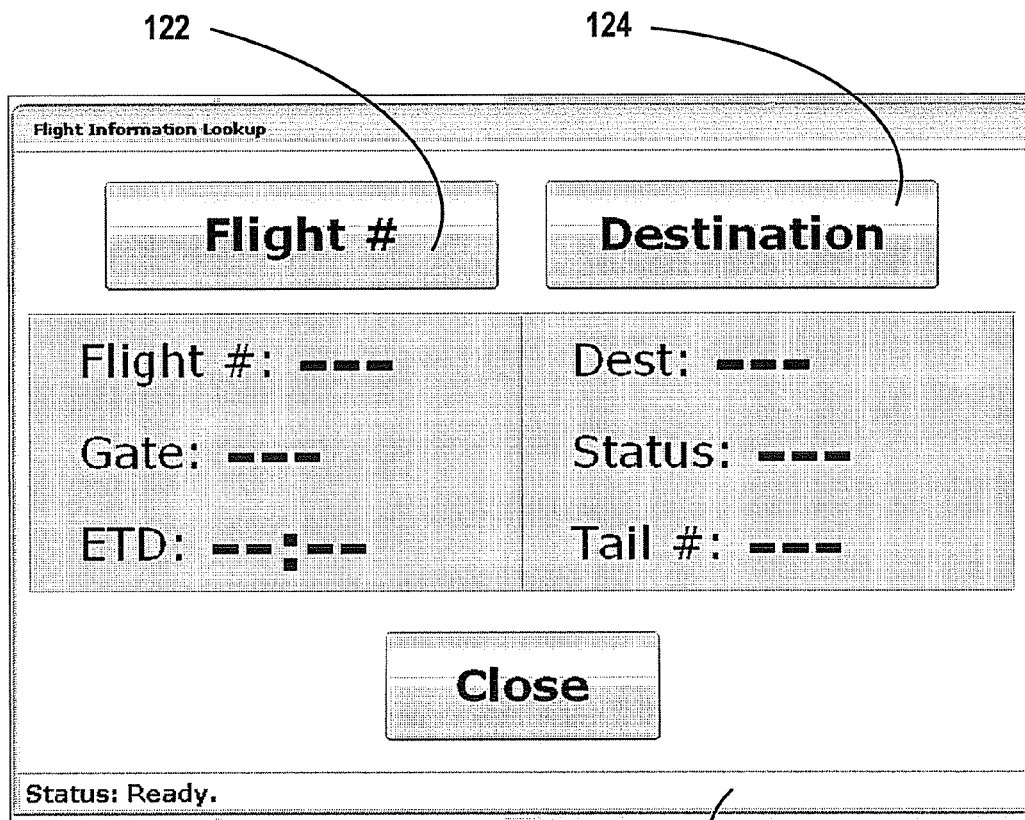

In an exemplary embodiment, as illustrated in FIG. 21 with continuing reference to FIGS. 1A-20, if the find flight button 118 is touched and/or otherwise selected, a flight information lookup dialog box 120 is displayed on the screen 44a and includes a flight number button 122 and a destination button 124. The flight number button 122 is touched and/or otherwise selected, which, in turn, causes a keypad (not shown) to be displayed on the screen 44a by which a flight number is entered and, in response, the corresponding flight's flight number, gate number, estimated time of departure, destination, status and tail number are displayed in the box 120. Instead of, or in addition to selecting the button 122, the destination button 124 is touched and/or otherwise selected, which, in turn, causes a keyboard (not shown) to be displayed on the screen 44a by which a destination location is entered and, in response, the flight number, gate number, estimated time of departure, destination, status and tail number are displayed in the box 120 for the next flight to that destination that has not yet departed the airport.

In an exemplary embodiment, with continuing reference to FIGS. 1A-21, to update the route 38 in the step 58e, the route 38 is automatically re-optimized by automatically repeating the step 48f or one or more steps thereof. If any adjustments or updates were made to the data associated with the transfer bags 34 to be transferred via the route 38 in the step 58d, the step 48f is executed with such updated data in the step 58e. Moreover, the step 48f is executed in the step 58e with any updated data such as, for example, gate changes, flight delays or flight cancellations, which events, if any, are automatically queried for and recognized before or during the step 58e, regardless of whether any adjustments or updates were made to the data in the step 58d. In an exemplary embodiment, to automatically query for and recognize events such as, for example, gate changes, flight delays or flight cancellations, in the step 58e, data stored in one or more of the user interfaces 26a, 26b and 26c, the user interface 20, the module 20, one or more other databases, and/or one or more components thereof, is automatically accessed and/or surveyed at a predetermined interval such as, for example, every 45 seconds, in the step 58e. In several exemplary embodiments, the route 38 is automatically re-optimized in the step 58e at a predetermined time interval such as, for example, every 45 seconds, regardless of whether data is adjusted in the step 58d, whether any events such as, for example, gate changes, flight delays or flight cancellations, are recognized in the step 58e, and/or any combination thereof; in several exemplary embodiments, if there are no data adjustments or updates or recognized events, the re-optimization in the step 58e yields the same route as the route 38 originally optimized in the step 48f.

Figure 22:
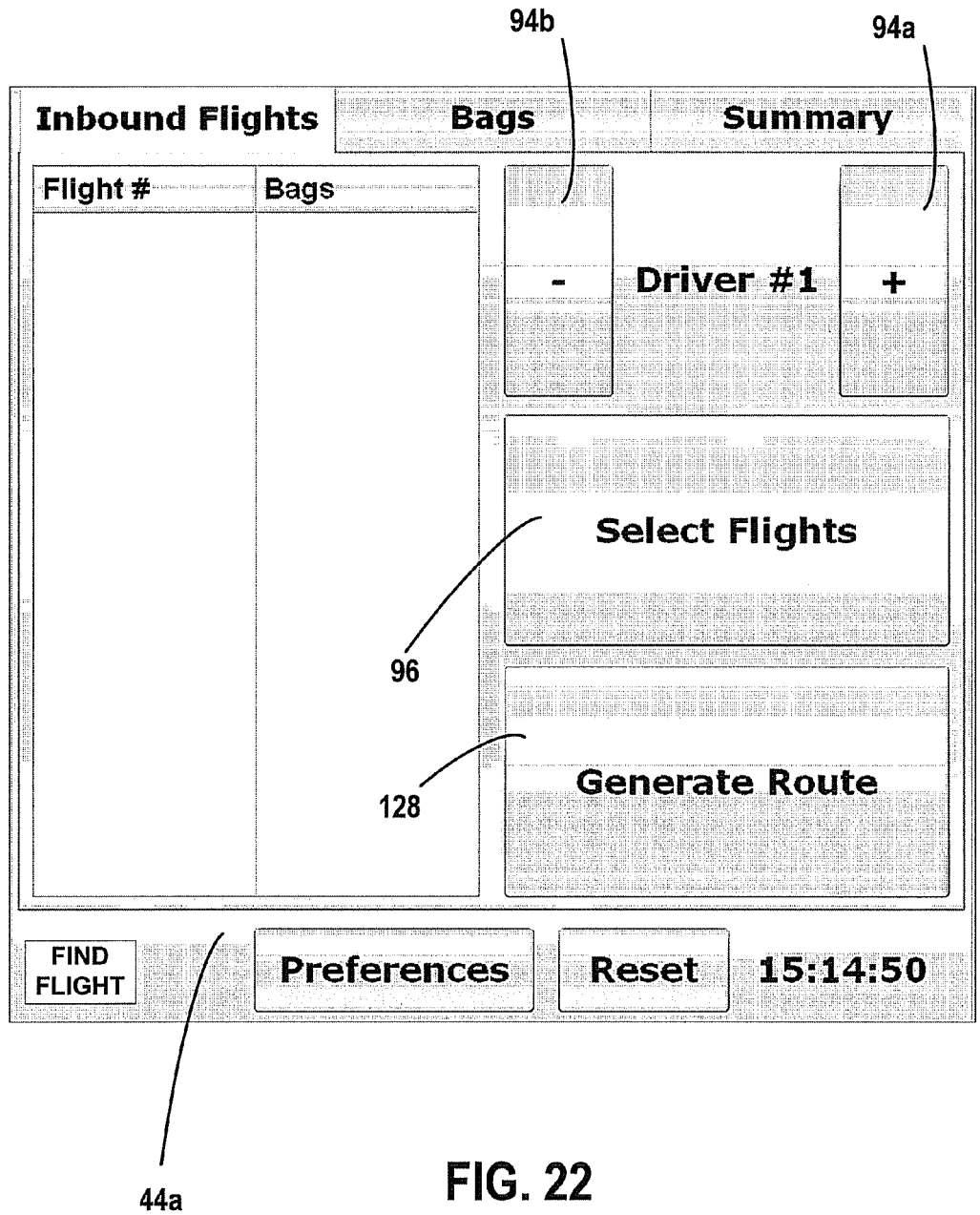
Figure 23:
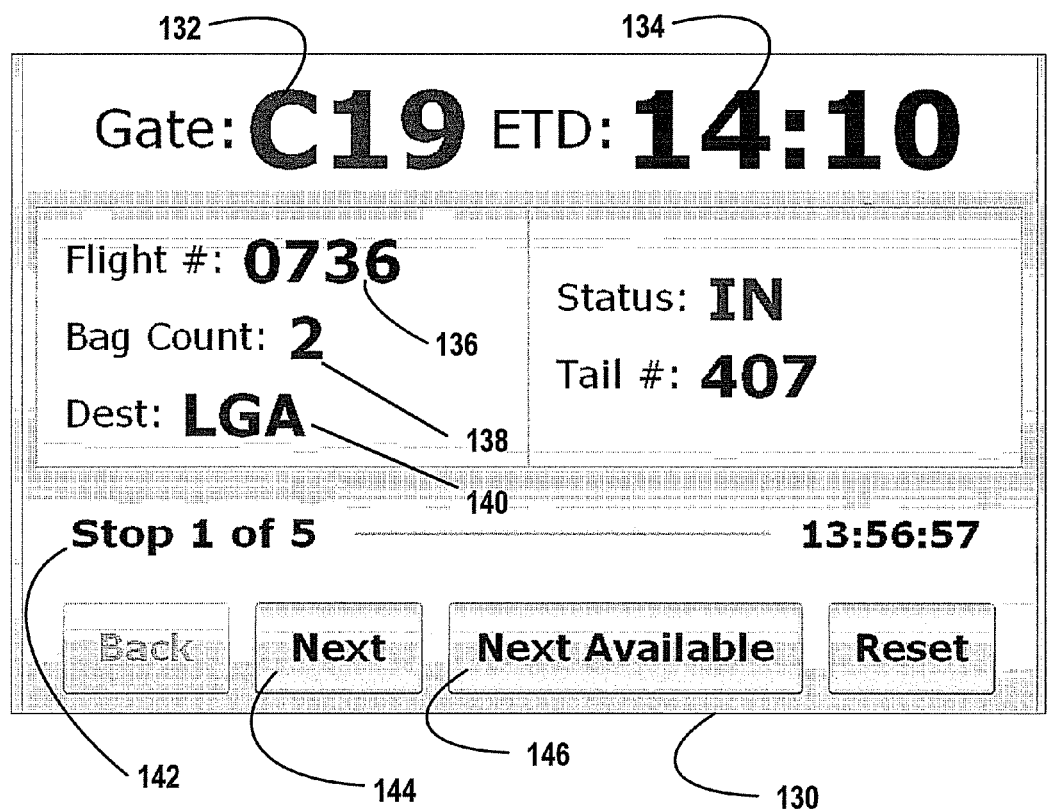

In an exemplary embodiment, as illustrated in FIGS. 22 and 23 with continuing reference to FIGS. 1A-21, to transfer bags from the arrival gate 30 to the departure gates 36 via the route 38 in the step 58f, a generate route button 128 (FIG. 22) is touched and/or otherwise selected and, in response, a stop output 130 (FIG. 23) is displayed on the 44a. As shown in FIG. 23, the stop output 130 corresponds to the first stop to travel to along the route 38 and includes a gate number data parameter field 132 identifying the gate number of the particular departure gate 36, an estimated time of departure data parameter field 134 indicating the estimated time of departure of the connecting flight departing from the departure gate 36, a flight number data parameter field 136 indicating the flight number of the connecting flight departing from the departure gate 36, a bag count data parameter field 138 indicating the quantity of the transfer bags 34 to be transferred to the connecting flight at the departure gate 36, a destination location data parameter field 140 identifying the destination location of the connecting flight departing from the departure gate 36, and a stop number data parameter field 142 indicating the stop number along the route 38; for example, since the output 130 corresponds to the initial stop along the route 38, the stop number data parameter field 142 displays "STOP 1 OF 5" with the term "5" indicating the total quantity of stops along the route 38.

During the step 58f, and before, during or after the stop output 130 is displayed on the screen 44a of the tablet personal computer 44 of the user interface 26a, the driver of the airline baggage tractor 28a drives the tractor 28a to the first stop along the route 38, which first stop is the departure gate 36 having the gate number identified in the gate number data parameter field 136 of the output 130, thereby transporting the transfer bags 34 to the first stop. The transfer bags 34 to be loaded onto the connecting flight departing from the departure gate 36 at the first stop are then unloaded off of the tractor 28a and/or its cart at the departure gate 36.

In an exemplary embodiment, if the transfer bags 34 to be loaded onto the connecting flight departing from the departure gate 36 at the first stop are not permitted to be so loaded because, for example, the connecting flight has already departed from the departure gate 36, a next available button 146 is touched or otherwise selected and, in response, a query is issued to determine the next flight having the same destination location as the connecting flight onto which the transfer bags 34 are not permitted to be loaded, and the flight information of the next available flight such as, for example, flight number, estimated time of departure and departure gate, is displayed on the screen 44a (not shown). In an exemplary embodiment, after viewing the output regarding the next available flight, if the driver of the tractor 28a approves of the next available flight, the driver of the tractor 28a accepts the next available flight by touching or otherwise selecting an acceptance-related button or icon (not shown), which results in the re-optimization of the route 38 in accordance with the foregoing, which re-optimization includes the departure gate of the next available flight as a stop. In an exemplary embodiment, after viewing the output regarding the next available flight, if the driver of the tractor 28a does not approve of the next available flight, the driver of the tractor 28a again touches or otherwise selects the next available button 146 and, in response, another query is issued to determine the next flight having the same destination as the connecting flight.

In an exemplary embodiment, if the first stop along the route 38 is a bag room rather than one of the departure gates 36, then the output 130 includes the stop number data parameter field 142, the term "BAG ROOM" and/or a code corresponding to a bag room, and a listing of all of the transfer bags 34 assigned to the bag room along with the flight number, destination, latest departure time and quantity of bags, and the output 130 does not include the gate number data parameter field 132, the estimated time of departure data parameter field 134, the flight number data parameter field 136, the bag count data parameter field 138, and the destination location data parameter field 140.

In an exemplary embodiment, with continuing reference to FIGS. 1A-22, before, during or after the transfer bags 34 to be loaded onto the connecting flight departing from the departure gate 36 at the first stop have been unloaded off the tractor 28a and/or its cart, a next button 144 is touched and/or otherwise selected and, in response, another stop output (not shown) is displayed on the screen 44a of the computer 44, which stop output corresponds to the second stop to travel to along the route 38 and also includes the gate number data parameter field 132, the estimated time of departure data parameter field 134, the flight number data parameter field 136, the bag count data parameter field 138, the destination location data parameter field 140, and the stop number data parameter field 142, with the fields displaying data or information associated with the second stop along the route 38; for example, the stop number data parameter field 142 displays "STOP 2 OF 5"; before, during or after the second stop output is displayed on the screen 44a of the tablet personal computer 44 of the user interface 26a, the driver of the airline baggage tractor 28a drives the tractor 28a to the second stop along the route 38, which second stop is the departure gate 36 having the gate number identified in the gate number data parameter field 136 of the another stop output, thereby transporting the transfer bags 34 to the second stop. The transfer bags 34 to be loaded onto the connecting flight departing from the departure gate 36 at the second stop are then unloaded off of the tractor 28a and/or its cart.

In an exemplary embodiment, if the transfer bags 34 to be loaded onto the connecting flight departing from the departure gate 36 at the second stop are not permitted to be so loaded because, for example, the connecting flight has already departed from the departure gate 36, the next available button 146 is touched or otherwise selected and, in response, a query is issued to determine the next flight having the same destination location as the connecting flight onto which the transfer bags 34 are not permitted to be loaded, and the flight information of the next available flight such as, for example, flight number, estimated time of departure and departure gate, is displayed on the screen 44a (next available flight information not shown). In an exemplary embodiment, after viewing the output regarding the next available flight, the driver of the tractor 28a accepts the next available flight by touching or otherwise selected an acceptance-related button or icon (not shown), which results in the re-optimization of the route 38 in accordance with the foregoing, which re-optimization includes the departure gate of the next available flight as a stop. In an exemplary embodiment, if the second stop along the route 38 is a bag room rather than one of the departure gates 36, then the another stop output includes at least the stop number data parameter field 142 and the term "BAG ROOM" and/or a code corresponding to a bag room, and the output 130 does not include the gate number data parameter field 132, the estimated time of departure data parameter field 134, the flight number data parameter field 136, the bag count data parameter field 138, and the destination location data parameter field 140.

The selection of the next button 144, the display of another stop output including either at least the combination of the gate number data parameter field 132, the estimated time of departure data parameter field 134, the flight number data parameter field 136, the bag count data parameter field 138, the destination location data parameter field 140, and the stop number data parameter field 142, or at least the combination of the stop number data parameter field 142 and the term "BAG ROOM" and/or a code corresponding to a bag room, and the travel to and the unloading of the transfer bags 34 at the next stop along the route 38, are repeated until all of the stops along the route 38 have been made and all of the transfer bags 34 have been distributed or transferred. In an exemplary embodiment, once all of the stops along the route 38 have been made, a finish button (not shown) is touched or otherwise selected and the driver of the tractor 28a returns to a common area, such as a break room, to wait for his or her next assignment.

Figure 24:
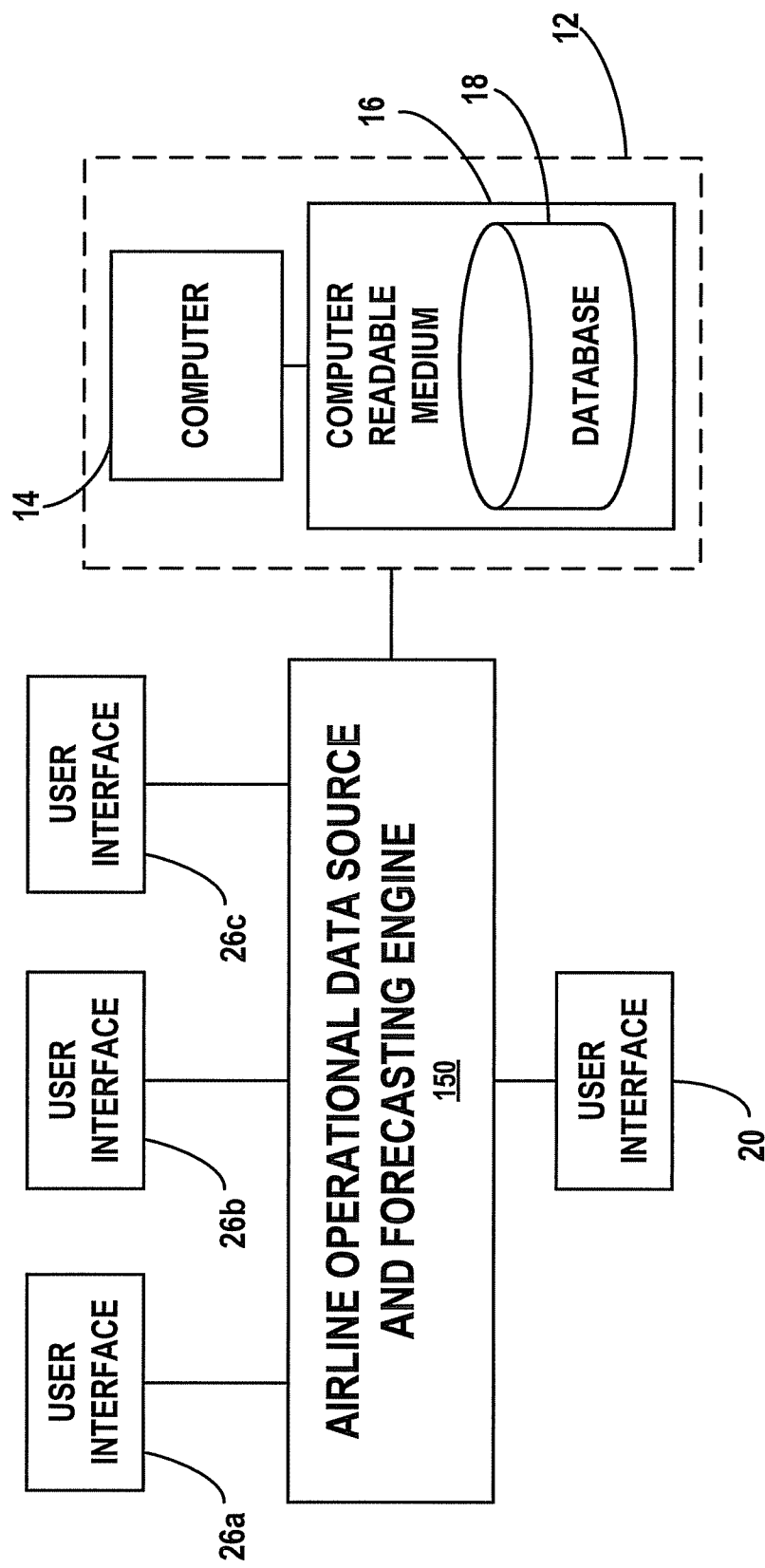
FIG. 24 is a diagrammatic illustration of a portion of the system of FIGS. 1A and 1B operably coupled to an airline operational data source and forecasting engine, according to an exemplary embodiment.

In an exemplary embodiment, as illustrated in FIG. 24 with continuing reference to FIGS. 1A-23, the system 10 includes an airline operational data source and forecasting engine 150, which is operably coupled to, and in communication with, the module 12, the user interfaces 26a, 26b and 26c, and the user interface 20.

In several exemplary embodiments, the engine 150 includes a computer readable medium or memory having a plurality of instructions stored therein, which instructions are accessible to, and executable by, a processor. In several exemplary embodiments, the engine 150 includes one or more data structures or databases, which databases are accessible to a processor. In several exemplary embodiments, the engine 150 includes a processor, a computer readable medium or memory operably coupled to the processor, a plurality of instructions stored in the computer readable medium and accessible to, and executable by, the processor, and one or more data structures or databases stored in the computer readable medium and accessible to the processor.

In an exemplary embodiment, the engine 150 provides data collection and management functionality. The engine 150 collects and stores real-time data from multiple sources and provides integrated data forecasts to the module 12, the user interface 20, the user interfaces 26a, 26b and 26c, and/or any combination thereof. In an exemplary embodiment, the data collected by the engine 150 includes latest published flight times and status, latest gate assignments, aircraft rotations, crew sequence information, passenger counts and connections, baggage counts and connections, crew legality information, curfew information, and slot restrictions. Additionally, the engine 150 is capable of generating forecasts of downline impacts as a result of existing delays throughout the system.

In an exemplary embodiment, the engine 150 issues a query for all flight data. In one embodiment, a flight operating system may respond to the query with flight data and crew data in raw form covering the time period 144 hours after the time of the query was made. The flight data includes:

flight number: an identifier for the flight,
destination: the destination for the current flight,
scheduled departure: the time that the aircraft is scheduled to pull back from the gate, published departure time: the published time that the aircraft is scheduled to pull back from the gate,
target departure: the time that the aircraft is targeted to pull back from the gate,
projected departure: a forecasted departure time based on the propagation forecast,
departure delay: the time that the departure has been delayed,
scheduled arrival: the time that the aircraft is scheduled to pull up to a gate, published arrival time: the published time that the aircraft is scheduled to pull up to a gate.
projected arrival: a forecasted arrival time based on the propagation forecast,
scheduled block time: number of minutes that reflects the difference between scheduled arrival time and scheduled departure time,
block difference: the difference between the scheduled block time and the flight plan,
missed connections: the number of customers that might miss a connection,
hold connections: the number of minutes a flight needs to be delayed to allow at least one of the missed connection passengers to make a connecting flight, hold arrive on-time: the number of minutes a flight could be delayed and still arrive on time,
departure gate: the gate from which the aircraft is departing.
arrival gate: the gate at which the aircraft is arriving,
cost index: a numerical value associated with the cost of fuel based on the speed of flying,
downline destination: the destination of the next flight for the aircraft, downline turn: time that the aircraft is scheduled on the ground at the downline station before the next flight of the aircraft, and slack: minutes above the planned minimum time of ground time at the down-line station before the next flight of the aircraft.

In an exemplary embodiment, the engine 150 also obtains or accesses passenger data. The passenger data is obtained every four hours and contains real-time booking information covering a 72 hour period. In another embodiment, the passenger data is requested or obtained each time a change occurs on a flight if the flight's load factor exceeds a predetermined threshold. In an exemplary embodiment, the passenger data includes names, club member identification numbers, passenger number record, connecting flight information, and bag information. Further, the engine 150 may obtain ADL files from a governmental organization (e.g., the Federal Aviation Administration), cargo information (such as unit, weight, connection information, and priority), and maintenance information for each aircraft.

The engine 150 is capable of producing three types of forecasting: (i) projected times, (ii) probable times, and (iii) postable times. Projected times are forecasted times based on resource dependencies and takes into account that no actions will be taken to reduce or adjust delays. One of the uses of the projected times forecast is the ability to detect potential problems early (such as legality and curfew issues). Probable times are based on the projected times and take into account that actions will be taken to reduce or adjust delays. One of the uses of the probable times is pre-planning and prioritization. Postable times are based on probable times and take into account variability in the forecast. One of the uses of the postable times is to publish estimated times of departures to passengers.

In an exemplary embodiment, the module 12 is part of the engine 150. In an exemplary embodiment, one or more components of the module 12, including the computer 14, the computer readable medium 16, content stored in the computer readable medium 16, the database 18, content stored in the database 18, and/or any combination thereof, are part of the engine 150. In an exemplary embodiment, the module 12 and/or one or more components thereof are part of, and/or are distributed throughout, the system 10 and/or one or more of the components thereof, including one or more of the engine 150, the user interfaces 26a, 26b and 26c, and the user interface 20. In an exemplary embodiment, the computer readable medium 16 and/or content stored therein are part of, and/or are distributed throughout, the system 10 and/or one or more of the components thereof, including one or more of the engine 150, the module 12, the user interfaces 26a, 26b and 26c, and the user interface 20. In an exemplary embodiment, the database 18 and/or the contents stored therein are part of, and/or are distributed throughout, the system 10 and/or one or more of the components thereof, including one or more of the engine 150, the module 12, the user interfaces 26a, 26b and 26c, and the user interface 20.

In several exemplary embodiments, to execute one or more of the steps 48, 50, 52, 54, 56 and 58 and/or steps or portions thereof, data is accessed from the engine 150. In several exemplary embodiments, the engine 150 executes in whole or in part one or more of the steps 48, 50, 52, 54, 56 and 58 and/or steps or portions thereof, in accordance with the foregoing. In several exemplary embodiments, to execute one or more of the steps 48a, 48b, 48c, 48d, 48e, 48f and 48g and/or steps or portions thereof, data is accessed from the engine 150. In several exemplary embodiments, the engine 150 executes in whole or in part one or more of the steps 48a, 48b, 48c, 48d, 48e, 48f and 48g and/or steps or portions thereof, in accordance with the foregoing. In several exemplary embodiments, to execute one or more of the steps 58a, 58b, 58c, 58d, 58e, 58f and 58g and/or steps or portions thereof, data is accessed from the engine 150. In several exemplary embodiments, the engine 150 executes in whole or in part one or more of the steps 58a, 58b, 58c, 58d, 58e, 58f and 58g and/or steps or portions thereof, in accordance with the foregoing.

In several exemplary embodiments, the method 46 is implemented by, or at least partially implemented by, the engine 150, the module 12, the user interface 20, the user interfaces 26a, 26b and 26c, and/or any combination thereof.

As noted above, the execution of the step 58 with the route 38, the airline baggage tractor 28a, and the user interface 26a, is substantially similar to the execution of the step 58 with the route 40, the airline baggage tractor 28b, and the user interface 26b, respectively, and is substantially similar to the execution of the step 58 with the route 42, the airline baggage tractor 28c, and the user interface 26c, respectively. Therefore, the execution of the step 58 with each of the routes 40 and 42, each of the airline baggage tractors 28b and 28c, and each of the user interfaces 26b and 26c, will not be described in detail. In several exemplary embodiments, the respective executions of the step 58 with each of routes 38, 40 and 42, each of the tractors 28a, 28b and 28c, and each of the user interfaces 26a, 26b and 26c, and/or portions thereof, occur simultaneously, serially and/or any combination thereof.

In an exemplary embodiment, a single driver—rather than a plurality of drivers—is used to distribute or transfer all of the transfer bags 34 to the departure gates 36 in the method 46. In an exemplary embodiment, if a single driver is used to distribute or transfer all of the transfer bags 34, then the method 46 is executed with a single driver, and the step 48 is executed with either the user interface 20 or one of the user interfaces 26a, 26b and 26c.

In an exemplary embodiment, if a single driver is used to distribute or transfer all of the transfer bags 34, then the steps 48, 50, 52, 54 and 56 are omitted from the method 46, and the step 58a of the step 58 of the method 46 includes generating an optimal route in response to the input of the arrival flight by the single driver in the step 58a; in an exemplary embodiment, the optimal route for the single driver is generated and thus selected in the step 58a in accordance with the step 48f of the step 48 of the method 46, with pre-selected optimization objectives; in an exemplary embodiment, the optimal route for the single driver is generated and thus selected in the step 58a in accordance with the steps 48e and 48f of the step 48 of the method 46. In an exemplary embodiment, the optimal route for the single driver, which is generated in response to the input in the step 58a, is displayed in the step 58b, and the steps 58c, 58d, 58e and 58f are executed with the single driver.

In several exemplary embodiments, the operation of the system 10 in whole or in part, and/or the execution of the method 46 in whole or in part, provides optimal orders in which to deliver the transfer bags 34 to the various departure gates 36, thereby minimizing the risk of missing connections; by providing the best order for bag delivery, the number of baggage mishandlings is minimized and the time required to transfer all of the transfer bags 34 to the departure gates 36 is minimized. In several exemplary embodiments, the operation of the system 10 in whole or in part, and/or the execution of the method 46 in whole or in part, increases productivity and reduces the risk of transferring bags to the wrong location and missing connecting flights on which transfer bags should have been loaded before the connecting flights departed. In several exemplary embodiments, the operation of the system 10 in whole or in part, and/or the execution of the method 46 in whole or in part, automates the process of generating optimal routing sequences, provides real-time flight information to the drivers of the tractors 28a, 28b and 28c so that the drivers always have accurate flight information, enables the resolution of any differences between what connecting or transfer bags are expected to be on an aircraft and what bags are actually on the aircraft to thereby have an accurate list of the transfer bags to be distributed or transferred, automatically replaces a connecting flight that has been canceled or has already departed with the next available flight to the destination location of the canceled or departed connecting flight so that the driver immediately knows where to take bags that cannot be delivered to their scheduled connecting flight thereby speeding up the process of transferring bags to their final destination location and reducing the risk of bag mishandling, permits a driver to look up details for any specific flight in real time from his or her tractor instead of using a radio to call a dispatcher or driving the tractor to a computer to look up flight information thereby saving time and allowing the driver to work more efficiently with accurate information. In several exemplary embodiments, the operation of the system 10 in whole or in part, and/or the execution of the method 46 in whole or in part, estimates the total time to unload all of the transfer bags 34 (roll time), recommends which bags should be sent to bag rooms, estimates the total time each driver will be occupied delivering bags, provides the ability to modify the set of objectives used to generate routes, provides the ability to output routes to various output devices, identifies bags at risk of missing their connections, identifies critical flights, and differentiates between two flights to the same destination.

In an exemplary embodiment, each of the tractors 28a, 28b and 28c includes a global positioning system, and the drivers' compliance with the method 46 is tracked and/or monitored with the global positioning systems. In an exemplary embodiment, instead of, or in addition to employing global positioning systems, compliance with the method 46 is tracked and/or monitored by tracking or monitoring the selection of the respective next buttons 144 and/or the selection of other icons and/or buttons during the execution of the method 46.

Figure 25:
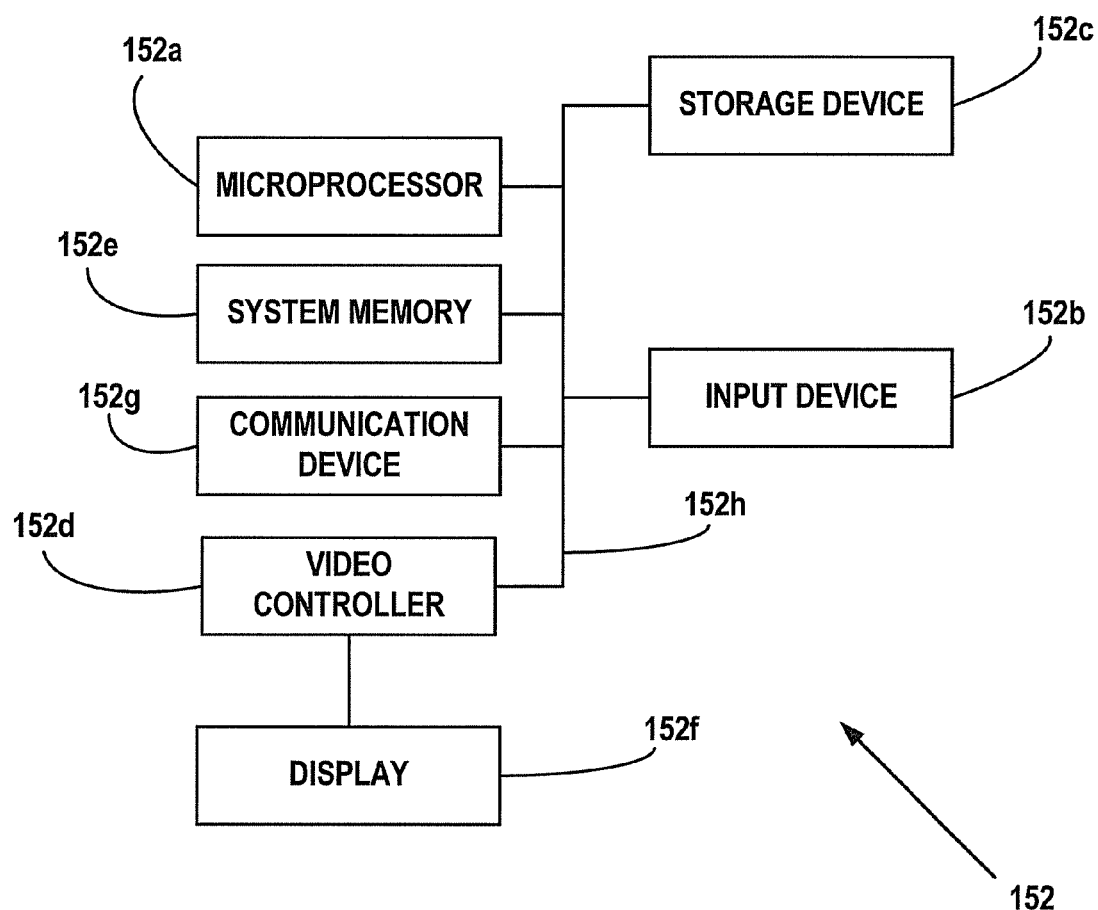
FIG. 25 is a diagrammatic illustration of a node for implementing one or more exemplary embodiments of the present disclosure, according to an exemplary embodiment.

In an exemplary embodiment, as illustrated in FIG. 25 with continuing reference to FIGS. 1A-24, an illustrative node 152 for implementing one or more embodiments of one or more of the above-described networks, elements, methods and/or steps, and/or any combination thereof, is depicted. The node 152 includes a microprocessor 152a, an input device 152b, a storage device 152c, a video controller 152d, a system memory 152e, a display 152f, and a communication device 152g all interconnected by one or more buses 152h. In several exemplary embodiments, the storage device 152c may include a floppy drive, hard drive, CD-ROM, optical drive, any other form of storage device and/or any combination thereof. In several exemplary embodiments, the storage device 152c may include, and/or be capable of receiving, a floppy disk, CD-ROM, DVD-ROM, or any other form of computer-readable medium that may contain executable instructions. In several exemplary embodiments, the communication device 152g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cell phones.

In several exemplary embodiments, one or more of the engine 150, the module 12, the user interfaces 26a, 26b and 26c, and the user interface 20, is, or at least includes, the node 152 and/or components thereof, and/or one or more nodes that are substantially similar to the node 152 and/or components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 22, and/or one or more portions thereof, may be designed to work on any specific architecture. In an exemplary embodiment, one or more portions of the network 22 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

A method has been described that includes determining a first optimal route via which a plurality of first articles are to be transferred from a first location to at least one second location in a plurality of second locations, comprising solving an optimization problem; selecting a first transfer route from one or more predetermined routes, the one or more predetermined routes comprising the first optimal route; and transferring the plurality of first articles from the first location via the first transfer route so that one or more of the first articles are transferred to each of the second locations. In an exemplary embodiment, the plurality of first articles is part of a plurality of airline transfer bags, the plurality of airline transfer bags further comprising one or more other pluralities of airline transfer bags; wherein the first location is an arrival gate of an inbound flight of an airplane; wherein the plurality of second locations is part of a plurality of departure gates of connecting flights, the plurality of departure gates further comprising one or more other pluralities of departure gates; and wherein the method further comprises generating a set of optimal routes, one of which optimal routes is the first optimal route; selecting a set of transfer routes from the one or more predetermined routes, one of which transfer routes is the first transfer route, the one or more predetermined routes comprising the set of optimal routes; distributing the set of transfer routes to one or more of the following: a plurality of drivers of airline baggage tractors so that at least one transfer route is distributed to each of the drivers; and a plurality of user interfaces so that at least one transfer route is distributed to each of the user interfaces; transferring the plurality of airline transfer bags from the arrival gate via the set of transfer routes, comprising transferring the plurality of first articles from the first location via the first transfer route so that one or more of the first articles are transferred to each of the second locations; and further comprising transferring the one or more other pluralities of airline transfer bags from the first location so that each plurality of airline transfer bags in the one or more other pluralities of airline transfer bags is transferred via one transfer route in the set of transfer routes so that one or more airline transfer bags in the each plurality of airline transfer bags are transferred to each of the departure gates in a respective one of the one or more other pluralities of departure gates. In an exemplary embodiment, generating the set of optimal routes comprises selecting the inbound flight; inputting the quantity of the plurality of drivers; and determining an optimal route for each of the drivers in the plurality of drivers, one of which optimal routes is the first optimal route, wherein determining the optimal route for each of the drivers in the plurality of drivers further comprises providing one or more optimization objectives, wherein the optimization problem is at least partially dependent upon the one or more optimization objectives; providing the optimization problem, comprising providing one or more optimization objective functions, providing one or more optimization constraints, providing one or more optimization parameters, and providing one or more optimization decision variables; wherein solving the optimization problem comprises solving the optimization problem with the optimization objective functions, the optimization constraints, the optimization parameters, and the optimization decision variables. In an exemplary embodiment, providing the one or more optimization objectives comprises selecting at least one of the one or more optimization objectives; and wherein the method further comprises outputting parameters of the inbound flight in response to selecting the inbound flight, comprising outputting one or more parameters associated with flight number of the inbound flight, outputting one or more parameters associated with the arrival gate of the inbound flight, and outputting one or more parameters associated with a total quantity of the transfer bags on the airplane of the inbound flight; outputting parameters of the connecting flights in response to selecting the inbound flight, comprising outputting, for each connecting flight, one or more parameters associated with the flight number of the each connecting flight, and outputting, for each connecting flight, one or more parameters associated with the departure gate of the each connecting flight; and outputting the set of optimal routes, comprising outputting, for each optimal route, a plurality of groups of parameters, each group of parameters comprising one or more parameters associated with a flight number of one of the connecting flights; and one or more parameters associated with a departure gate of the one of the connecting flights. In an exemplary embodiment, each of the user interfaces comprises an input device and an output device; wherein transferring the plurality of airline transfer bags from the arrival gate via the set of transfer routes further comprises (a) inputting, with the input device, the flight number of the inbound flight; (b) inputting, with the input device, a parameter associated with a specific transfer route in the set of transfer routes; (c) outputting to the output device one or more parameters associated with one of the departure gates at which a stop is to be made along the specific transfer route; (d) after outputting to the output device the one or more parameters associated with the one of the departure gates at which a stop is to be made along the specific transfer route, outputting to the output device one or more parameters associated with another departure gate at which a stop is to be made along the specific transfer route; and (e) if all of the parameters associated with all of the departure gates at which stops are to be made along the specific transfer route have not been outputted, then repeating step (d) until all of the parameters associated with all of the departure gates at which stops are to be made along the specific transfer route have been outputted. In an exemplary embodiment, the first articles comprise airline transfer bags; wherein the first location is an arrival gate of an inbound flight of an airplane; wherein the second locations comprise departure gates of connecting flights; wherein the first transfer route is the first optimal route and the first optimal route is automatically selected as the first transfer route in response to the determination of the first optimal route; wherein determining the first optimal route comprises selecting the inbound flight with an input device of a user interface; providing one or more optimization objectives, wherein the optimization problem is at least partially dependent upon the one or more optimization objectives; and providing the optimization problem, comprising providing one or more optimization objective functions, providing one or more optimization constraints, providing one or more optimization parameters, and providing one or more optimization decision variables; wherein solving the optimization problem comprises solving the optimization problem with the optimization objective functions, the optimization constraints, the optimization parameters, and the optimization decision variables; wherein transferring the plurality of first articles from the first location via the first transfer route so that one or more of the first articles are transferred to each of the second locations comprises transferring the airline transfer bags from the arrival gate via the first optimal route so that one or more of the airline transfer bags are transferred to each of the departure gates, comprising (a) outputting to an output device of the user interface one or more parameters associated with one of the departure gates at which a stop is to be made along the first optimal route; (b) after outputting to the output device the one or more parameters associated with the one of the departure gates at which a stop is to be made along the first optimal route, outputting to the output device one or more parameters associated with another departure gate at which a stop is to be made along the first optimal route; and (c) if all of the parameters associated with all of the departure gates at which stops are to be made along the first optimal route have not been outputted, then repeating step (b) until all of the parameters associated with all of the departure gates at which stops are to be made along the first optimal route have been outputted. In an exemplary embodiment, the method comprises automatically querying for updated data; and automatically repeating determining the first optimal route with the updated data, comprising automatically repeating solving the optimization problem with the updated data. In an exemplary embodiment, the method comprises generating a set of manual routes; wherein the one or more predetermined routes further comprise the set of manual routes.

A system has been described that includes means for determining a first optimal route via which a plurality of first articles are to be transferred from a first location to at least one second location in a plurality of second locations, comprising means for solving an optimization problem; means for selecting a first transfer route from one or more predetermined routes, the one or more predetermined routes comprising the first optimal route; and means for transferring the plurality of first articles from the first location via the first transfer route so that one or more of the first articles are transferred to each of the second locations. In an exemplary embodiment, the plurality of first articles is part of a plurality of airline transfer bags, the plurality of airline transfer bags further comprising one or more other pluralities of airline transfer bags; wherein the first location is an arrival gate of an inbound flight of an airplane; wherein the plurality of second locations is part of a plurality of departure gates of connecting flights, the plurality of departure gates further comprising one or more other pluralities of departure gates; and wherein the system further comprises means for generating a set of optimal routes, one of which optimal routes is the first optimal route; means for selecting a set of transfer routes from the one or more predetermined routes, one of which transfer routes is the first transfer route, the one or more predetermined routes comprising the set of optimal routes; means for distributing the set of transfer routes to one or more of the following: a plurality of drivers of airline baggage tractors so that at least one transfer route is distributed to each of the drivers; and a plurality of user interfaces so that at least one transfer route is distributed to each of the user interfaces; means for transferring the plurality of airline transfer bags from the arrival gate via the set of transfer routes, comprising means for transferring the plurality of first articles from the first location via the first transfer route so that one or more of the first articles are transferred to each of the second locations; and further comprising means for transferring the one or more other pluralities of airline transfer bags from the first location so that each plurality of airline transfer bags in the one or more other pluralities of airline transfer bags is transferred via one transfer route in the set of transfer routes so that one or more airline transfer bags in the each plurality of airline transfer bags are transferred to each of the departure gates in a respective one of the one or more other pluralities of departure gates. In an exemplary embodiment, means for generating the set of optimal routes comprises means for selecting the inbound flight; means for inputting the quantity of the plurality of drivers; and means for determining an optimal route for each of the drivers in the plurality of drivers, one of which optimal routes is the first optimal route, wherein means for determining the optimal route for each of the drivers in the plurality of drivers further comprises means for providing one or more optimization objectives, wherein the optimization problem is at least partially dependent upon the one or more optimization objectives; means for providing the optimization problem, comprising means for providing one or more optimization objective functions, means for providing one or more optimization constraints, means for providing one or more optimization parameters, and means for providing one or more optimization decision variables; wherein means for solving the optimization problem comprises means for solving the optimization problem with the optimization objective functions, the optimization constraints, the optimization parameters, and the optimization decision variables. In an exemplary embodiment, means for providing the one or more optimization objectives comprises means for selecting at least one of the one or more optimization objectives; and wherein the system further comprises means for outputting parameters of the inbound flight in response to selecting the inbound flight, comprising means for outputting one or more parameters associated with flight number of the inbound flight, means for outputting one or more parameters associated with the arrival gate of the inbound flight, and means for outputting one or more parameters associated with a total quantity of the transfer bags on the airplane of the inbound flight; means for outputting parameters of the connecting flights in response to selecting the inbound flight, comprising means for outputting, for each connecting flight, one or more parameters associated with the flight number of the each connecting flight, and means for outputting, for each connecting flight, one or more parameters associated with the departure gate of the each connecting flight; and means for outputting the set of optimal routes, comprising means for outputting, for each optimal route, a plurality of groups of parameters, each group of parameters comprising one or more parameters associated with a flight number of one of the connecting flights; and one or more parameters associated with a departure gate of the one of the connecting flights. In an exemplary embodiment, each of the user interfaces comprises an input device and an output device; wherein means for transferring the plurality of airline transfer bags from the arrival gate via the set of transfer routes further comprises means for inputting, with the input device, the flight number of the inbound flight; means for inputting, with the input device, a parameter associated with a specific transfer route in the set of transfer routes; and means for: (a) outputting to the output device one or more parameters associated with one of the departure gates at which a stop is to be made along the specific transfer route; (b) after outputting to the output device the one or more parameters associated with the one of the departure gates at which a stop is to be made along the specific transfer route, outputting to the output device one or more parameters associated with another departure gate at which a stop is to be made along the specific transfer route; and (c) if all of the parameters associated with all of the departure gates at which stops are to be made along the specific transfer route have not been outputted, then repeating step (b) until all of the parameters associated with all of the departure gates at which stops are to be made along the specific transfer route have been outputted. In an exemplary embodiment, the first articles comprise airline transfer bags; wherein the first location is an arrival gate of an inbound flight of an airplane; wherein the second locations comprise departure gates of connecting flights; wherein the first transfer route is the first optimal route and the first optimal route is automatically selected as the first transfer route in response to the determination of the first optimal route; wherein means for determining the first optimal route comprises means for selecting the inbound flight with an input device of a user interface; means for providing one or more optimization objectives, wherein the optimization problem is at least partially dependent upon the one or more optimization objectives; and means for providing the optimization problem, comprising means for providing one or more optimization objective functions, means for providing one or more optimization constraints, means for providing one or more optimization parameters, and means for providing one or more optimization decision variables; wherein means for solving the optimization problem comprises means for solving the optimization problem with the optimization objective functions, the optimization constraints, the optimization parameters, and the optimization decision variables; wherein means for transferring the plurality of first articles from the first location via the first transfer route so that one or more of the first articles are transferred to each of the second locations comprises means for transferring the airline transfer bags from the arrival gate via the first optimal route so that one or more of the airline transfer bags are transferred to each of the departure gates, comprising means for: (a) outputting to an output device of the user interface one or more parameters associated with one of the departure gates at which a stop is to be made along the first optimal route; (b) after outputting to the output device the one or more parameters associated with the one of the departure gates at which a stop is to be made along the first optimal route, outputting to the output device one or more parameters associated with another departure gate at which a stop is to be made along the first optimal route; and (c) if all of the parameters associated with all of the departure gates at which stops are to be made along the first optimal route have not been outputted, then repeating step (b) until all of the parameters associated with all of the departure gates at which stops are to be made along the first optimal route have been outputted. In an exemplary embodiment, the system comprises means for automatically querying for updated data; and means for automatically repeating determining the first optimal route with the updated data, comprising means for automatically repeating solving the optimization problem with the updated data. In an exemplary embodiment, the system comprises means for generating a set of manual routes; wherein the one or more predetermined routes further comprise the set of manual routes.

A system has been described that includes a computer readable medium comprising a plurality of instructions stored therein, the plurality of instructions comprising instructions for determining a first optimal route via which a plurality of first articles are to be transferred from a first location to at least one second location in a plurality of second locations, comprising instructions for solving an optimization problem; and instructions for selecting a first transfer route from one or more predetermined routes, the one or more predetermined routes comprising the first optimal route; wherein the plurality of first articles are adapted to be transferred from the first location via the first transfer route so that one or more of the first articles are transferred to each of the second locations. In an exemplary embodiment, the system comprises a user interface and a functional module operably coupled to, and in communication with, the user interface via a network, wherein at least a portion of the computer readable medium is a part of one or more of the user interface and the functional module; an airline baggage tractor associated with the user interface; and an airline operational data source and forecasting engine wherein either: the engine is operably coupled to, and in communication with, one or more of the functional module and the user interface, or the engine comprises the functional module. In an exemplary embodiment, the plurality of first articles is part of a plurality of airline transfer bags, the plurality of airline transfer bags further comprising one or more other pluralities of airline transfer bags; wherein the first location is an arrival gate of an inbound flight of an airplane; wherein the plurality of second locations is part of a plurality of departure gates of connecting flights, the plurality of departure gates further comprising one or more other pluralities of departure gates; and wherein the plurality of instructions further comprises instructions for generating a set of optimal routes, one of which optimal routes is the first optimal route; instructions for selecting a set of transfer routes from the one or more predetermined routes, one of which transfer routes is the first transfer route, the one or more predetermined routes comprising the set of optimal routes; instructions for distributing the set of transfer routes to one or more of the following: a plurality of drivers of airline baggage tractors so that at least one transfer route is distributed to each of the drivers; and a plurality of user interfaces so that at least one transfer route is distributed to each of the user interfaces; and wherein the one or more other pluralities of airline transfer bags are transferred from the first location so that each plurality of airline transfer bags in the one or more other pluralities of airline transfer bags is transferred via one transfer route in the set of transfer routes so that one or more airline transfer bags in the each plurality of airline transfer bags are transferred to each of the departure gates in a respective one of the one or more other pluralities of departure gates. In an exemplary embodiment, instructions for generating the set of optimal routes comprise instructions for selecting the inbound flight; instructions for inputting the quantity of the plurality of drivers; and instructions for determining an optimal route for each of the drivers in the plurality of drivers, one of which optimal routes is the first optimal route, wherein instruction for determining the optimal route for each of the drivers in the plurality of drivers further comprise instructions for providing one or more optimization objectives, wherein the optimization problem is at least partially dependent upon the one or more optimization objectives; and instructions for providing the optimization problem, comprising instructions for providing one or more optimization objective functions, instructions for providing one or more optimization constraints, instructions for providing one or more optimization parameters, and instructions for providing one or more optimization decision variables; wherein instructions for solving the optimization problem comprise instructions for solving the optimization problem with the optimization objective functions, the optimization constraints, the optimization parameters, and the optimization decision variables. In an exemplary embodiment, instructions for providing the one or more optimization objectives comprise instructions for selecting at least one of the one or more optimization objectives; and wherein the plurality of instructions further comprises instructions for outputting parameters of the inbound flight in response to selecting the inbound flight, comprising instructions for outputting one or more parameters associated with flight number of the inbound flight, instructions for outputting one or more parameters associated with the arrival gate of the inbound flight, and instructions for outputting one or more parameters associated with a total quantity of the transfer bags on the airplane of the inbound flight; instructions for outputting parameters of the connecting flights in response to selecting the inbound flight, comprising instructions for outputting, for each connecting flight, one or more parameters associated with the flight number of the each connecting flight, and instructions for outputting, for each connecting flight, one or more parameters associated with the departure gate of the each connecting flight; and instructions for outputting the set of optimal routes, comprising instructions for outputting, for each optimal route, a plurality of groups of parameters, each group of parameters comprising one or more parameters associated with a flight number of one of the connecting flights; and one or more parameters associated with a departure gate of the one of the connecting flights. In an exemplary embodiment, each of the user interfaces comprises an input device and an output device; and wherein the plurality of instructions further comprises instructions for inputting, with the input device, the flight number of the inbound flight; instructions for inputting, with the input device, a parameter associated with a specific transfer route in the set of transfer routes; and instructions for: (a) outputting to the output device one or more parameters associated with one of the departure gates at which a stop is to be made along the specific transfer route; (b) after outputting to the output device the one or more parameters associated with the one of the departure gates at which a stop is to be made along the specific transfer route, outputting to the output device one or more parameters associated with another departure gate at which a stop is to be made along the specific transfer route; and (c) if all of the parameters associated with all of the departure gates at which stops are to be made along the specific transfer route have not been outputted, then repeating step (b) until all of the parameters associated with all of the departure gates at which stops are to be made along the specific transfer route have been outputted. In an exemplary embodiment, the first articles comprise airline transfer bags; wherein the first location is an arrival gate of an inbound flight of an airplane; wherein the second locations comprise departure gates of connecting flights; wherein the first transfer route is the first optimal route and the first optimal route is automatically selected as the first transfer route in response to the determination of the first optimal route; wherein instructions for determining the first optimal route comprise instructions for selecting the inbound flight with an input device of a user interface; instructions for providing one or more optimization objectives, wherein the optimization problem is at least partially dependent upon the one or more optimization objectives; and instructions for providing the optimization problem, comprising instructions for providing one or more optimization objective functions, instructions for providing one or more optimization constraints, instructions for providing one or more optimization parameters, and instructions for providing one or more optimization decision variables; wherein instructions for solving the optimization problem comprise instructions for solving the optimization problem with the optimization objective functions, the optimization constraints, the optimization parameters, and the optimization decision variables; wherein the airline transfer bags are transferred from the arrival gate via the first optimal route so that one or more of the airline transfer bags are transferred to each of the departure gates; and wherein the plurality of instructions further comprises instructions for: (a) outputting to an output device of the user interface one or more parameters associated with one of the departure gates at which a stop is to be made along the first optimal route; (b) after outputting to the output device the one or more parameters associated with the one of the departure gates at which a stop is to be made along the first optimal route, outputting to the output device one or more parameters associated with another departure gate at which a stop is to be made along the first optimal route; and (c) if all of the parameters associated with all of the departure gates at which stops are to be made along the first optimal route have not been outputted, then repeating step (b) until all of the parameters associated with all of the departure gates at which stops are to be made along the first optimal route have been outputted. In an exemplary embodiment, the plurality of instructions comprises instructions for automatically querying for updated data; and instructions for automatically repeating determining the first optimal route with the updated data, comprising instructions for automatically repeating solving the optimization problem with the updated data. In an exemplary embodiment, the plurality of instructions comprises instructions for generating a set of manual routes; wherein the one or more predetermined routes further comprise the set of manual routes.

It is understood that variations may be made in the foregoing without departing from the scope of the disclosure. For example, instead of, or in addition to transfers of articles often conducted in the course of airline industry business, aspects of the present disclosure are applicable and/or readily adaptable to article transfers conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to transfers of articles such as shipping cargo according to which pieces of shipping cargo are transferred to different ships at, for example, a port. In an exemplary embodiment, aspects of the present disclosure are readily applicable and/or readily adaptable to transfers of articles such as trucking cargo according to which pieces of trucking cargo are transferred to different trucks at, for example, a trucking distribution facility. In an exemplary embodiment, aspects of the present disclosure are readily applicable and/or readily adaptable to transfers of articles such as rail cargo according to which pieces of rail cargo are transferred to different trains at, for example, a rail yard. In an exemplary embodiment, aspects of the present disclosure are applicable and/or readily adaptable to a wide variety of transfers of articles.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method comprising:
   determining, using a computer system, a first optimal route via which a plurality of first articles are to be transferred from a first location to at least one second location in a plurality of second locations, comprising determining the first optimal route from a plurality of potential routes, wherein each of the potential routes has a trip time equaling the amount of time necessary to both travel the potential route and transfer the first articles via the potential route, and wherein determining the first optimal route from the plurality of potential routes comprises:
      solving an optimization problem using the computer system, the optimization problem comprising:
         an objective function given by at least the following expression:

$$\text{Minimize } w_1 \sum_{i \in S} \text{missed}_i \cdot B_i + w_2 \sum_{k \in N} \text{Trip}_k + w_3 T\max + w_4 T\min +$$
$$w_5 \sum_{i \in Sgate} \text{critical\_gate}_i \cdot B_i + w_6 \sum_{i \in Sbagroom} \text{critical\_bagroom}_i \cdot B_i$$

a plurality of constraints given by at least the following expressions:

$$\sum_{j \in S \setminus \{A\}} x_{A,j,k} \leq 1, \quad (\forall k \in N)$$

$$\sum_{i \in S \setminus \{s\}} x_{i,s,k} = \sum_{j \in S \setminus \{s\}} x_{s,j,k}, \quad \forall s \in S, \forall k \in N$$

$$\sum_{j \in S \setminus \{i\}, k \in N} x_{i,j,k} = 1, \quad \forall i \in S \setminus \{A\}$$

$$\sum_{i \in S1, j \in S1 \setminus \{i\}} x_{i,j,k} \leq |S1| - 1, \quad \forall S1 \subset S \setminus \{A\}, k \in N$$

$$t_A = 0,$$

$$t_j \geq t_i + T_{i,j} x_{i,j,k} - (1 - x_{i,j,k}) \cdot M, \forall i \in S, j \in S \setminus \{A\}, k \in N$$

$$\text{Trip}_k \geq t_i + T_{i,A,k} x_{i,A,k} - (1 - x_{i,A,k}) \cdot M, \forall i \in S \setminus \{A\}, k \in N$$

$$T\max = \max(\text{Trip}_1, \ldots, \text{Trip}_n),$$

$$T\min = \min(\text{Trip}_1, \ldots, \text{Trip}_n),$$

wherein:
A=the first location;
n=number of drivers;
N=set of all of the drivers (1, 2, ..., n);
M=big integer value;
S=set of the second locations and the first location;
Sgate=first subset of second locations (Sgate ⊂ S);
Sbagroom=second subset of second locations (Sbagroom ⊂ S);
$B_i$=number of first articles for second location i;
$Wait_i$=waiting time at second location i;
$D_{ij}$=distance between second location i and second location j;
unload_rate=time used to unload one first article at the second location;
$T_{ij}=(D_{ij}/(\text{rate of travel between second location i and second location j}))+wait_j+\text{unload\_rate} \times B_j$;
$x_{i,j,k}=1$ if driver k delivers to second location j immediately after second location i and 0 otherwise;
$missed_i=1$ if first articles for second location i are missed and 0 otherwise;
$critical\_gate_i=1$ if first articles for second location i in the first subset are delivered within a first predetermined amount of time before an event time and 0 otherwise for $\forall i \in Sgate$;
$critical\_bagroom_i=1$ if first articles for second location i in the second subset are delivered within a second predetermined amount of time before an event time and 0 otherwise for $\forall i \in Sbagroom$;
$t_i$=time after a driver finishes unloading at second location i;
$\text{Trip}_k$=trip time for driver k;
Tmax=maximum trip time among all of the drivers; and
Tmin=minimum trip time among all of the drivers;
selecting, using the computer system, a first transfer route from one or more predetermined routes, the one or more predetermined routes comprising the first optimal route; and
transferring the plurality of first articles from the first location via the first transfer route so that one or more of the first articles are transferred to each of the second locations.

2. The method of claim 1 wherein the plurality of first articles is part of a plurality of airline transfer bags, the plurality of airline transfer bags further comprising one or more other pluralities of airline transfer bags;
wherein the first location is an arrival gate of an inbound flight of an airplane;
wherein the plurality of second locations comprises a plurality of departure gates of connecting flights, the plurality of departure gates further comprising one or more other pluralities of departure gates;
and
wherein the method further comprises:
generating a set of optimal routes, one of which optimal routes is the first optimal route;
selecting a set of transfer routes from the one or more predetermined routes, one of which transfer routes is the first transfer route, the one or more predetermined routes comprising the set of optimal routes; and transferring the plurality of airline transfer bags from the arrival gate via the set of transfer routes, comprising transferring the plurality of first articles from the first location via the first transfer route so that one or more of the first articles are transferred to each of the second locations;

and further comprising:
transferring the one or more other pluralities of airline transfer bags from the first location so that:
each plurality of airline transfer bags in the one or more other pluralities of airline transfer bags is transferred via one transfer route in the set of transfer routes so that:
one or more airline transfer bags in the each plurality of airline transfer bags are transferred to each of the departure gates in a respective one of the one or more other pluralities of departure gates.

3. The method of claim 2 wherein generating the set of optimal routes comprises:
selecting the inbound flight;
inputting the number of drivers; and
determining an optimal route for each driver k, one of which optimal routes is the first optimal route.

4. The method of claim 3 further comprising:
outputting parameters of the inbound flight in response to selecting the inbound flight, comprising:
outputting one or more parameters associated with flight number of the inbound flight,
outputting one or more parameters associated with the arrival gate of the inbound flight, and
outputting one or more parameters associated with a total quantity of the transfer bags on the airplane of the inbound flight;
outputting parameters of the connecting flights in response to selecting the inbound flight, comprising:
outputting, for each connecting flight, one or more parameters associated with the flight number of the each connecting flight, and
outputting, for each connecting flight, one or more parameters associated with the departure gate of the each connecting flight; and
outputting the set of optimal routes, comprising:
outputting, for each optimal route, a plurality of groups of parameters, each group of parameters comprising:
one or more parameters associated with a flight number of one of the connecting flights; and
one or more parameters associated with a departure gate of the one of the connecting flights.

5. The method of claim 2
wherein transferring the plurality of airline transfer bags from the arrival gate via the set of transfer routes further comprises:
(a) inputting, with an input device, the flight number of the inbound flight;
(b) inputting, with the input device, a parameter associated with a specific transfer route in the set of transfer routes;
(c) outputting to an output device one or more parameters associated with one of the departure gates at which a stop is to be made along the specific transfer route;
(d) after outputting to the output device the one or more parameters associated with the one of the departure gates at which a stop is to be made along the specific transfer route, outputting to the output device one or more parameters associated with another departure gate at which a stop is to be made along the specific transfer route; and
(e) if all of the parameters associated with all of the departure gates at which stops are to be made along the specific transfer route have not been outputted, then repeating step (d) until all of the parameters associated with all of the departure gates at which stops are to be made along the specific transfer route have been outputted.

6. The method of claim 2 further comprising:
generating a set of manual routes;
wherein the one or more predetermined routes further comprise the set of manual routes.

7. The method of claim 1 wherein the first articles comprise airline transfer bags;
wherein the first location is an arrival gate of an inbound flight of an airplane;
wherein the second locations comprise departure gates of connecting flights;
wherein the first transfer route is the first optimal route and the first optimal route is automatically selected as the first transfer route in response to the determination of the first optimal route;
wherein determining the first optimal route comprises:
selecting the inbound flight with an input device of a user interface;
and
wherein transferring the plurality of first articles from the first location via the first transfer route so that one or more of the first articles are transferred to each of the second locations comprises:
transferring the airline transfer bags from the arrival gate via the first optimal route so that one or more of the airline transfer bags are transferred to each of the departure gates, comprising:
(a) outputting to an output device of the user interface one or more parameters associated with one of the departure gates at which a stop is to be made along the first optimal route;
(b) after outputting to the output device the one or more parameters associated with the one of the departure gates at which a stop is to be made along the first optimal route, outputting to the output device one or more parameters associated with another departure gate at which a stop is to be made along the first optimal route; and
(c) if all of the parameters associated with all of the departure gates at which stops are to be made along the first optimal route have not been outputted, then repeating step (b) until all of the parameters associated with all of the departure gates at which stops are to be made along the first optimal route have been outputted.

8. The method of claim 1 further comprising:
automatically querying for updated data; and
automatically repeating determining the first optimal route with the updated data, comprising automatically repeating solving the optimization problem with the updated data.

9. A system comprising:
means for determining a first optimal route via which a plurality of first articles are to be transferred from a first location to at least one second location in a plurality of second locations, comprising means for determining the first optimal route from a plurality of potential routes, wherein each of the potential routes has a trip time equaling the amount of time necessary to both travel the potential route and transfer the first articles via the potential route, and wherein means for determining the first optimal route from the plurality of potential routes comprises:
means for solving an optimization problem, the optimization problem comprising:
an objective function given by at least the following expression:

$$\text{Minimize } w_1 \sum_{i \in S} \text{missed}_i \cdot B_i + w_2 \sum_{k \in N} \text{Trip}_k + w_3 Tmax + w_4 Tmin +$$
$$w_5 \sum_{i \in Sgate} \text{critical\_gate}_i \cdot B_i + w_6 \sum_{i \in Sbagroom} \text{critical\_bagroom}_i \cdot B_i$$

a plurality of constraints given by at least the following expressions:

$$\sum_{j \in S \setminus \{A\}} x_{A,j,k} \leq 1, \quad \forall k \in N$$

$$\sum_{i \in S \setminus \{s\}} x_{i,s,k} = \sum_{j \in S \setminus \{s\}} x_{s,j,k}, \quad \forall s \in S, \forall k \in N$$

$$\sum_{j \in S \setminus \{i\}, k \in N} x_{i,j,k} = 1, \quad \forall i \in S \setminus \{A\}$$

$$\sum_{i \in S1, j \in S1 \setminus \{i\}} x_{i,j,k} \leq |S1| - 1, \quad \forall S1 \subset S \setminus \{A\}, k \in N$$

$t_A = 0,$ $t_j \geq t_i + T_{i,j} \cdot x_{i,j,k} - (1 - x_{i,j,k}) \cdot M, \forall i \in S, j \in S \setminus \{A\}, k \in N$ $\text{Trip}_k \geq t_i + T_{i,A,k} \cdot x_{i,A,k} - (1 - x_{i,A,k}) \cdot M, \forall i \in S \setminus \{A\}, k \in N$ $Tmax = \max(\text{Trip}_1, \ldots, \text{Trip}_n),$ $Tmin = \min(\text{Trip}_1, \ldots, \text{Trip}_n),$ wherein:
A = the first location;
n = number of drivers;
N = set of all of the drivers (1, 2, ..., n);
M = big integer value;
S = set of the second locations and the first location;
Sgate = first subset of second locations (Sgate ⊂ S);
Sbagroom = second subset of second locations (Sbagroom ⊂ S);
$B_i$ = number of first articles for second location i;
$\text{Wait}_i$ = waiting time at second location
$D_{ij}$ = distance between second location i and second location j;
unload_rate = time used to unload one first article at the second location;
$T_{ij}$ = ($D_{ij}$/(rate of travel between second location i and second location j))+$\text{Wait}_j$+unload_rate×$B_j$;
$x_{i,j,k}$ = 1 if driver k delivers to second location j immediately after second location i and 0 otherwise;
$\text{missed}_i$ = 1 if first articles for second location i are missed and 0 otherwise;
critical_gate$_i$ = 1 if first articles for second location i in the first subset are delivered within a first predetermined amount of time before an event time and 0 otherwise for $\forall i \in Sgate$;
critical_bagroom$_i$ = 1 if first articles for second location i in the second subset are delivered within a second predetermined amount of time before an event time and 0 otherwise for $\forall i \in S$bagroom;
$t_i$ = time after a driver finishes unloading at second location i;
$\text{Trip}_k$ = trip time for driver k;
Tmax = maximum trip time among all of the drivers; and
Tmin = minimum trip time among all of the drivers;
means for selecting a first transfer route from one or more predetermined routes, the one or more predetermined routes comprising the first optimal route; and
means for transferring the plurality of first articles from the first location via the first transfer route so that one or more of the first articles are transferred to each of the second locations.

10. The system of claim 9 wherein the plurality of first articles is part of a plurality of airline transfer bags, the plurality of airline transfer bags further comprising one or more other pluralities of airline transfer bags;
wherein the first location is an arrival gate of an inbound flight of an airplane;
wherein the plurality of second locations comprises a plurality of departure gates of connecting flights, the plurality of departure gates further comprising one or more other pluralities of departure gates; and
wherein the system further comprises:
means for generating a set of optimal routes, one of which optimal routes is the first optimal route;
means for selecting a set of transfer routes from the one or more predetermined routes, one of which transfer routes is the first transfer route, the one or more predetermined routes comprising the set of optimal routes; and
means for transferring the plurality of airline transfer bags from the arrival gate via the set of transfer routes, comprising means for transferring the plurality of first articles from the first location via the first transfer route so that one or more of the first articles are transferred to each of the second locations;
and further comprising:
means for transferring the one or more other pluralities of airline transfer bags from the first location so that:
each plurality of airline transfer bags in the one or more other pluralities of airline transfer bags is transferred via one transfer route in the set of transfer routes so that:
one or more airline transfer bags in the each plurality of airline transfer bags are transferred to each of the departure gates in a respective one of the one or more other pluralities of departure gates.

11. The system of claim 10 wherein means for generating the set of optimal routes comprises:
means for selecting the inbound flight;
means for inputting the number of drivers; and
means for determining an optimal route for each driver k, one of which optimal routes is the first optimal route.

12. The system of claim 11 further comprising:
means for outputting parameters of the inbound flight in response to selecting the inbound flight, comprising:
means for outputting one or more parameters associated with flight number of the inbound flight,
means for outputting one or more parameters associated with the arrival gate of the inbound flight, and
means for outputting one or more parameters associated with a total quantity of the transfer bags on the airplane of the inbound flight;
means for outputting parameters of the connecting flights in response to selecting the inbound flight, comprising:
means for outputting, for each connecting flight, one or more parameters associated with the flight number of the each connecting flight, and
means for outputting, for each connecting flight, one or more parameters associated with the departure gate of the each connecting flight;
and
means for outputting the set of optimal routes, comprising:
means for outputting, for each optimal route, a plurality of groups of parameters, each group of parameters comprising:
one or more parameters associated with a flight number of one of the connecting flights; and
one or more parameters associated with a departure gate of the one of the connecting flights.

13. The system of claim 10
wherein means for transferring the plurality of airline transfer bags from the arrival gate via the set of transfer routes further comprises:
means for inputting, with an input device, the flight number of the inbound flight;
means for inputting, with the input device, a parameter associated with a specific transfer route in the set of transfer routes;
and
means for:
(a) outputting to an output device one or more parameters associated with one of the departure gates at which a stop is to be made along the specific transfer route;
(b) after outputting to the output device the one or more parameters associated with the one of the departure gates at which a stop is to be made along the specific transfer route, outputting to the output device one or more parameters associated with another departure gate at which a stop is to be made along the specific transfer route; and
(c) if all of the parameters associated with all of the departure gates at which stops are to be made along the specific transfer route have not been outputted, then repeating step (b) until all of the parameters associated with all of the departure gates at which stops are to be made along the specific transfer route have been outputted.

14. The system of claim 10 further comprising:
means for generating a set of manual routes;
wherein the one or more predetermined routes further comprise the set of manual routes.

15. The system of claim 9 wherein the first articles comprise airline transfer bags;
wherein the first location is an arrival gate of an inbound flight of an airplane;
wherein the second locations comprise departure gates of connecting flights;
wherein the first transfer route is the first optimal route and the first optimal route is automatically selected as the first transfer route in response to the determination of the first optimal route;
wherein means for determining the first optimal route comprises:
means for selecting the inbound flight with an input device of a user interface;
and
wherein means for transferring the plurality of first articles from the first location via the first transfer route so that one or more of the first articles are transferred to each of the second locations comprises:
means for transferring the airline transfer bags from the arrival gate via the first optimal route so that one or more of the airline transfer bags are transferred to each of the departure gates, comprising:
means for:
(a) outputting to an output device of the user interface one or more parameters associated with one of the departure gates at which a stop is to be made along the first optimal route;
(b) after outputting to the output device the one or more parameters associated with the one of the departure gates at which a stop is to be made along the first optimal route, outputting to the output device one or more parameters associated with another departure gate at which a stop is to be made along the first optimal route; and
(c) if all of the parameters associated with all of the departure gates at which stops are to be made along the first optimal route have not been outputted, then repeating step (b) until all of the parameters associated with all of the departure gates at which stops are to be made along the first optimal route have been outputted.

16. The system of claim 9 further comprising:
means for automatically querying for updated data; and
means for automatically repeating determining the first optimal route with the updated data, comprising means for automatically repeating solving the optimization problem with the updated data.

17. A system comprising:
a computer readable medium that is non-transitory, the computer readable medium comprising a plurality of instructions stored therein, the plurality of instructions comprising:
instructions for determining a first optimal route via which a plurality of first articles are to be transferred from a first location to at least one second location in a plurality of second locations, comprising instructions for determining the first optimal route from a plurality of potential routes, wherein each of the potential routes has a trip time equaling the amount of time necessary to both travel the potential route and transfer the first articles via the potential route, and wherein instructions for determining the first optimal route from the plurality of potential routes comprise:
instructions for solving an optimization problem, the optimization problem comprising:
an objective function given by at least the following expression:

$$\text{Minimize } w_1 \sum_{i \in S} \text{missed}_i \cdot B_i + w_2 \sum_{k \in N} \text{Trip}_k + w_3 Tmax + w_4 Tmin +$$
$$w_5 \sum_{i \in Sgate} \text{critical\_gate}_i \cdot B_i + w_6 \sum_{i \in Sbagroom} \text{critical\_bagroom}_i \cdot B_i$$

a plurality of constraints given by at least the following expressions:

$$\sum_{j \in S\setminus\{A\}} x_{A,j,k} \leq 1, \quad \forall k \in N$$

$$\sum_{i \in S\setminus\{s\}} x_{i,s,k} = \sum_{j \in S\setminus\{s\}} x_{s,j,k}, \quad \forall s \in S, \forall k \in N$$

$$\sum_{j \in S\setminus\{i\}, k \in N} x_{i,j,k} = 1, \quad \forall i \in S\setminus\{A\}$$

$$\sum_{i \in S1, j \in S1\setminus\{i\}} x_{i,j,k} \leq |S1| - 1, \quad \forall S1 \subset S\setminus\{A\}, k \in N$$

$t_A = 0$, $t_j \geq t_i + T_{i,j} x_{i,j,k} - (1 - x_{i,j,k}) \cdot M, \forall i \in S, j \in S\setminus\{A\}, k \in N$ $\text{Trip}_k \geq t_i + T_{i,A,k} x_{i,A,k} - (1 - x_{i,A,k}) \cdot M, \forall i \in S\setminus\{A\}, k \in N$ $Tmax = \max(\text{Trip}_1, \ldots, \text{Trip}_n)$, $Tmin = \min(\text{Trip}_1, \ldots, \text{Trip}_n)$, wherein:
A=the first location;
n=number of drivers;
N=set of all of the drivers (1, 2, . . . , n);
M=big integer value;
S=set of the second locations and the first location;
Sgate=first subset of second locations (Sgate ⊂ S);
Sbagroom=second subset of second locations (Sbagroom ⊂ S);
$B_i$=number of first articles for second location i;
$Wait_i$=waiting time at second location i;
$D_{ij}$=distance between second location i and second location j;
unload_rate=time used to unload one first article at the second location;
$T_{ij} = (D_{ij}/(\text{rate of travel between second location i and second location j})) + Wait_j + \text{unload\_rate} \times B_j$;
$x_{i,j,k} = 1$ if driver k delivers to second location j immediately after second location i and 0 otherwise;
$\text{missed}_i = 1$ if first articles for second location i are missed and 0 otherwise;
$\text{critical\_gate}_i = 1$ if first articles for second location i in the first subset are delivered within a first predetermined amount of time before an event time and 0 otherwise for $\forall i \in Sgate$;
$\text{critical\_bagroom}_i = 1$ if first articles for second location i in the second subset are delivered within a second predetermined amount of time before an event time and 0 otherwise for $\forall i \in S\text{bagroom}$;
$t_i$=time after a driver finishes unloading at second location i;
$\text{Trip}_k$=trip time for driver k;

$T_{max}$=maximum trip time among all of the drivers; and
$T_{min}$=minimum trip time among all of the drivers; and instructions for selecting a first transfer route from one or more predetermined routes, the one or more predetermined routes comprising the first optimal route;

wherein the plurality of first articles are adapted to be transferred from the first location via the first transfer route so that one or more of the first articles are transferred to each of the second locations.

18. The system of claim 17 further comprising:
a user interface and a functional module operably coupled to, and in communication with, the user interface via a network, wherein at least a portion of the computer readable medium is a part of one or more of the user interface and the functional module;
an airline baggage tractor associated with the user interface; and
an airline operational data source and forecasting engine wherein either:
the engine is operably coupled to, and in communication with, one or more of the functional module and the user interface,
or
the engine comprises the functional module.

19. The system of claim 17 wherein the plurality of first articles is part of a plurality of airline transfer bags, the plurality of airline transfer bags further comprising one or more other pluralities of airline transfer bags;
wherein the first location is an arrival gate of an inbound flight of an airplane;
wherein the plurality of second locations comprises a plurality of departure gates of connecting flights, the plurality of departure gates further comprising one or more other pluralities of departure gates;
and
wherein the plurality of instructions further comprises:
instructions for generating a set of optimal routes, one of which optimal routes is the first optimal route;
instructions for selecting a set of transfer routes from the one or more predetermined routes, one of which transfer routes is the first transfer route, the one or more predetermined routes comprising the set of optimal routes;
and
wherein the one or more other pluralities of airline transfer bags are transferred from the first location so that:
each plurality of airline transfer bags in the one or more other pluralities of airline transfer bags is transferred via one transfer route in the set of transfer routes so that:
one or more airline transfer bags in the each plurality of airline transfer bags are transferred to each of the departure gates in a respective one of the one or more other pluralities of departure gates.

20. The system of claim 19 wherein instructions for generating the set of optimal routes comprise:
instructions for selecting the inbound flight;
instructions for inputting the number of drivers; and
instructions for determining an optimal route for each driver k, one of which optimal routes is the first optimal route.

21. The system of claim 20 wherein the plurality of instructions further comprises:
instructions for outputting parameters of the inbound flight in response to selecting the inbound flight, comprising:

instructions for outputting one or more parameters associated with flight number of the inbound flight, instructions for outputting one or more parameters associated with the arrival gate of the inbound flight, and instructions for outputting one or more parameters associated with a total quantity of the transfer bags on the airplane of the inbound flight;

instructions for outputting parameters of the connecting flights in response to selecting the inbound flight, comprising:

instructions for outputting, for each connecting flight, one or more parameters associated with the flight number of the each connecting flight, and instructions for outputting, for each connecting flight, one or more parameters associated with the departure gate of the each connecting flight;

and instructions for outputting the set of optimal routes, comprising:

instructions for outputting, for each optimal route, a plurality of groups of parameters, each group of parameters comprising:

one or more parameters associated with a flight number of one of the connecting flights; and one or more parameters associated with a departure gate of the one of the connecting flights.

22. The system of claim 19 wherein the plurality of instructions further comprises:

instructions for inputting, with an input device, the flight number of the inbound flight;

instructions for inputting, with the input device, a parameter associated with a specific transfer route in the set of transfer routes;

and instructions for:

(a) outputting to an output device one or more parameters associated with one of the departure gates at which a stop is to be made along the specific transfer route;

(b) after outputting to the output device the one or more parameters associated with the one of the departure gates at which a stop is to be made along the specific transfer route, outputting to the output device one or more parameters associated with another departure gate at which a stop is to be made along the specific transfer route; and (c) if all of the parameters associated with all of the departure gates at which stops are to be made along the specific transfer route have not been outputted, then repeating step (b) until all of the parameters associated with all of the departure gates at which stops are to be made along the specific transfer route have been outputted.

23. The system of claim 19 wherein the plurality of instructions further comprises:

instructions for generating a set of manual routes;

wherein the one or more predetermined routes further comprise the set of manual routes.

24. The system of claim 17 wherein the first articles comprise airline transfer bags;

wherein the first location is an arrival gate of an inbound flight of an airplane;

wherein the second locations comprise departure gates of connecting flights;

wherein the first transfer route is the first optimal route and the first optimal route is automatically selected as the first transfer route in response to the determination of the first optimal route;

wherein instructions for determining the first optimal route comprise:

instructions for selecting the inbound flight with an input device of a user interface;

and wherein the airline transfer bags are transferred from the arrival gate via the first optimal route so that one or more of the airline transfer bags are transferred to each of the departure gates;

and wherein the plurality of instructions further comprises:

instructions for:

(a) outputting to an output device of the user interface one or more parameters associated with one of the departure gates at which a stop is to be made along the first optimal route;

(b) after outputting to the output device the one or more parameters associated with the one of the departure gates at which a stop is to be made along the first optimal route, outputting to the output device one or more parameters associated with another departure gate at which a stop is to be made along the first optimal route; and (c) if all of the parameters associated with all of the departure gates at which stops are to be made along the first optimal route have not been outputted, then repeating step (b) until all of the parameters associated with all of the departure gates at which stops are to be made along the first optimal route have been outputted.

25. The system of claim 17 wherein the plurality of instructions further comprise:

instructions for automatically querying for updated data; and instructions for automatically repeating determining the first optimal route with the updated data, comprising instructions for automatically repeating solving the optimization problem with the updated data.

* * * * *